US011580297B2

(12) United States Patent
Chang et al.

(10) Patent No.: US 11,580,297 B2
(45) Date of Patent: *Feb. 14, 2023

(54) SYSTEMS AND METHODS FOR CONVERSION OF WEB CONTENT INTO REUSABLE TEMPLATES AND COMPONENTS

(71) Applicant: Open Text Corporation, Waterloo (CA)

(72) Inventors: John W. Chang, San Jose, CA (US); Paul Kieron Carl Narth, San Carlos, CA (US); Sampada Khare, Santa Clara, CA (US); Sunil Menon, Saratoga, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,842

(22) Filed: Dec. 7, 2021

(65) Prior Publication Data
US 2022/0092259 A1   Mar. 24, 2022

Related U.S. Application Data

(63) Continuation of application No. 15/849,237, filed on Dec. 20, 2017, now Pat. No. 11,295,074.
(Continued)

(51) Int. Cl.
G06F 40/186   (2020.01)
G06F 16/958   (2019.01)
G06F 40/166   (2020.01)
G06F 3/0483   (2013.01)
H04L 67/02   (2022.01)

(52) U.S. Cl.
CPC .......... *G06F 40/186* (2020.01); *G06F 3/0483* (2013.01); *G06F 16/958* (2019.01); *G06F 40/166* (2020.01); *H04L 67/02* (2013.01)

(58) Field of Classification Search
CPC ..... G06F 40/186; G06F 16/958; G06F 40/166
See application file for complete search history.

(56) References Cited

U.S. PATENT DOCUMENTS 6,605,120 B1   8/2003   Fields et al.
7,073,122 B1   7/2006   Sedghi
(Continued)

FOREIGN PATENT DOCUMENTS

EP   2728498   5/2014

OTHER PUBLICATIONS

Office Action issued in Application No. 17883227.5, dated Dec. 17, 2021, 11 pgs.
(Continued)

*Primary Examiner* — Benjamin Smith
(74) *Attorney, Agent, or Firm* — Sprinkle IP Law Group

(57) ABSTRACT

Embodiments as disclosed provide a What-You-See-Is-What-You Get (WYSIWYG) editor for web content, allowing the conversion of previously generated web content to reusable templates or components. Embodiments thus allow, among other advantages, users such as web content developers to easily repurpose or reuse previously developed pages or content by giving these users the ability to review and edit previously developed pages or content in a WYSIWYG editor.

21 Claims, 10 Drawing Sheets

Related U.S. Application Data

(60) Provisional application No. 62/437,155, filed on Dec. 21, 2016.

(56) References Cited

U.S. PATENT DOCUMENTS

| | | | |
|---|---|---|---|
| 7,441,187 B2 | 10/2008 | Meadows | |
| 7,593,960 B2 | 9/2009 | Kahn et al. | |
| 7,681,112 B1* | 3/2010 | Francis | G06F 40/131 |
| | | | 715/201 |
| 7,703,004 B2 | 4/2010 | Bier | |
| 7,840,648 B1* | 11/2010 | Rosenstein | G06F 16/958 |
| | | | 715/705 |
| 8,046,681 B2 | 10/2011 | Vydiswaran et al. | |
| 8,312,425 B2 | 11/2012 | Hepper | |
| 8,321,846 B2 | 11/2012 | Chatterjee | |
| 8,438,312 B2 | 5/2013 | Kapur et al. | |
| 8,464,148 B1* | 6/2013 | Wichary | G06F 16/958 |
| | | | 717/113 |
| 8,522,134 B1* | 8/2013 | Zetlen | G06F 40/117 |
| | | | 715/234 |
| 8,566,704 B1* | 10/2013 | Le Bescond de Coatpont | |
| | | | G06F 40/166 |
| | | | 715/234 |
| 8,694,904 B2* | 4/2014 | Verlaan | G06F 40/166 |
| | | | 715/770 |
| 8,713,520 B2* | 4/2014 | Bank | G06F 8/38 |
| | | | 717/113 |
| 8,875,032 B2 | 10/2014 | Olsen et al. | |
| 9,021,348 B1 | 4/2015 | Meschkat et al. | |
| 9,092,414 B2 | 7/2015 | Levy et al. | |
| 9,201,852 B2* | 12/2015 | Ge | G06F 40/177 |
| 9,262,185 B2 | 2/2016 | Hill et al. | |
| 9,426,201 B2 | 8/2016 | Burckart et al. | |
| 9,652,441 B2* | 5/2017 | Le Bescond de Coatpont | |
| | | | G06F 40/186 |
| 10,198,408 B1* | 2/2019 | Commisso | G06F 40/143 |
| 10,318,628 B2 | 6/2019 | Le Bescond de Coatpont | |
| 2003/0204810 A1* | 10/2003 | Dam | G06F 40/14 |
| | | | 715/255 |
| 2003/0204811 A1* | 10/2003 | Dam | G06F 16/958 |
| | | | 715/255 |
| 2005/0275662 A1 | 12/2005 | DiStefano, III | |
| 2006/0143182 A1 | 6/2006 | Meadows | |
| 2006/0149751 A1 | 7/2006 | Jade et al. | |
| 2006/0248442 A1* | 11/2006 | Rosenstein | G06F 40/177 |
| | | | 715/255 |
| 2007/0206221 A1 | 9/2007 | Wyler et al. | |
| 2008/0071929 A1 | 3/2008 | Motte et al. | |
| 2008/0148157 A1 | 6/2008 | Kamdar et al. | |
| 2008/0168345 A1 | 7/2008 | Becker | |
| 2009/0006454 A1* | 1/2009 | Zarzar | G06F 3/04847 |
| | | | 707/999.102 |
| 2009/0019386 A1 | 1/2009 | Sweetland et al. | |
| 2009/0064106 A1* | 3/2009 | Webster | G06F 8/36 |
| | | | 717/120 |
| 2009/0235158 A1* | 9/2009 | Rosenstein | G06F 16/93 |
| | | | 715/234 |
| 2009/0259949 A1* | 10/2009 | Verlaan | G06F 40/166 |
| | | | 715/760 |
| 2009/0282349 A1 | 11/2009 | Olsen et al. | |
| 2010/0083102 A1* | 4/2010 | Jimenez | G06F 40/166 |
| | | | 715/255 |
| 2010/0095197 A1* | 4/2010 | Klevenz | G06F 40/166 |
| | | | 715/234 |
| 2010/0199197 A1 | 8/2010 | Faletski et al. | |
| 2012/0110482 A1* | 5/2012 | Zhang | G06F 8/38 |
| | | | 715/762 |
| 2012/0151329 A1* | 6/2012 | Cordasco | G06F 16/958 |
| | | | 715/234 |
| 2013/0014002 A1* | 1/2013 | Cai | G06F 40/103 |
| | | | 715/234 |
| 2013/0212062 A1 | 8/2013 | Levy et al. | |
| 2013/0298010 A1 | 11/2013 | Rogers et al. | |
| 2014/0006913 A1* | 1/2014 | Gopalakrishna | G06F 16/986 |
| | | | 707/E17.116 |
| 2014/0019848 A1* | 1/2014 | Le Bescond de Coatpont | |
| | | | B01L 3/502715 |
| | | | 715/234 |
| 2014/0026115 A1* | 1/2014 | Bank | G06F 8/38 |
| | | | 717/113 |
| 2014/0040862 A1* | 2/2014 | Webster | G06F 8/61 |
| | | | 717/121 |
| 2014/0129924 A1* | 5/2014 | Le Bescond de Coatpont | |
| | | | G06F 16/986 |
| | | | 715/234 |
| 2014/0215306 A1* | 7/2014 | Chiculita | G06F 40/186 |
| | | | 715/234 |
| 2014/0237350 A1* | 8/2014 | Ryall | H04L 65/403 |
| | | | 715/234 |
| 2014/0351692 A1* | 11/2014 | Ge | G06F 40/177 |
| | | | 715/235 |
| 2015/0142567 A1* | 5/2015 | Neelakant | G06Q 30/0256 |
| | | | 705/14.54 |
| 2015/0154162 A1* | 6/2015 | Nijjer | G06F 40/146 |
| | | | 715/234 |
| 2015/0186544 A1* | 7/2015 | Benedum | H04L 67/56 |
| | | | 715/234 |
| 2016/0062963 A1* | 3/2016 | Umapathy | G06F 40/166 |
| | | | 715/760 |
| 2016/0070813 A1* | 3/2016 | Unter Ecker | G06F 8/38 |
| | | | 715/234 |
| 2016/0103928 A1* | 4/2016 | Glasgow | G06F 40/186 |
| | | | 715/234 |
| 2016/0188682 A1* | 6/2016 | Silverstein | G06F 40/143 |
| | | | 707/803 |
| 2016/0335243 A1* | 11/2016 | Zhai | G06F 16/2228 |
| 2016/0371249 A1* | 12/2016 | Chilakamarri | G06F 16/93 |
| 2017/0083480 A1* | 3/2017 | Salier-Hellendag | |
| | | | G06F 40/166 |
| 2018/0210864 A1* | 7/2018 | Zhang | G06F 40/30 |
| 2019/0065155 A1* | 2/2019 | Varadarajan | G06F 8/34 |
| 2019/0065157 A1* | 2/2019 | Varadarajan | G06F 8/34 |

OTHER PUBLICATIONS

International Search Report and Written Opinion issued for PCT Application No. PCT/US 17/67680, dated Mar. 9, 2018, 7 pages.

International Preliminary Report on Patentability and Written Opinion for International Application No. PCT/US2017/067680, dated Jul. 4, 2019, 6 pgs.

Extended European Search Report issued in Application No. 17883227.5, dated Jul. 24, 2020, 11 pgs.

European Search Report for European Patent Application No. 13191618.1, dated Dec. 10, 2013, 6 pgs.

Office Action issued for U.S. Appl. No. 14/073,516, dated Feb. 10, 2016, 12 pages.

Office Action issued for U.S. Appl. No. 14/073,516, dated Aug. 10, 2016, 16 pages.

Jiang et al. "TEB: A Template-based E-Commence Website Builder for SMEs", 2008 IEEE, pp. 23-28.

Su-bin et al. "A Direct Web Page Templates Detection Method", 2011 IEEE, 4 pages.

Yin et al. "A Template-based Method for Theme Information Extraction from Web Pages", 2010 IEEE, pp. 721-725.

Office Action issued for European Patent Application No. 13191618.1, dated Mar. 2, 2018, 6 pages.

Office Action for U.S. Appl. No. 15/484,860, dated Sep. 4, 2018, 18 pgs.

\* cited by examiner

SYSTEMS AND METHODS FOR CONVERSION OF WEB CONTENT INTO REUSABLE TEMPLATES AND COMPONENTS

RELATED APPLICATION(S)

This application is a continuation of, and claims a benefit under 35 U.S.C. 120 of, U.S. patent application Ser. No. 15/849,237 filed on Dec. 20, 2017, entitled "SYSTEMS AND METHODS FOR CONVERSION OF WEB CONTENT INTO REUSABLE TEMPLATES AND COMPONENTS," which claims a benefit of priority under 35 U.S.C. § 119 from U.S. Provisional Patent Application No. 62/437,155 filed on Dec. 21, 2016, entitled "SYSTEMS AND METHODS FOR CONVERSION OF WEB CONTENT INTO REUSABLE TEMPLATES AND COMPONENTS," the entire contents of which are hereby fully incorporated by reference herein for all purposes.

TECHNICAL FIELD

This disclosure relates generally to the management and development of web content. More particularly, this disclosure relates to embodiments of systems and methods for creating reusable templates and components for use in web content management and development. Even more specifically, this disclosure relates to embodiments of systems and methods for converting existing web content into reusable templates and components.

BACKGROUND

Ever since the advent of the Internet, web sites have been steadily growing more complicated, encompassing an ever-expanding amount of increasingly complex content. Developers of web sites, however, desire to have a common look and feel across their web site. Thus, a large amount of time may be spent by web content developers to ensure that the pages or other content of a web site has a common look and feel (or design). In many instances, this work may be duplicative. The code or time required to make a page or its contents conform to a common look or feel may be similar to the code or amount of time required to make another page or its contents conform to that look or feel.

Not only is independent work on multiple pages somewhat duplicative, but it introduces variations into the look and feel of those web pages, just by virtue of the fact that multiple web content developers may be working on the web site. The multiple web content developers introduce their own inconsistencies (e.g., relative to the look or feel or its implementation by other web content developers) into the various pages and content they develop.

Even more problematic in some cases is that these pages and content may have to be (re)developed across various platforms. Thus, for example, a web content developer may create a page or other content for a particular platform (e.g., a desktop browsing environment) that conforms to a desired look and feel. The web content developer (or another developer altogether) may then have to create a separate version of that page or content for use in another platform (e.g., a mobile device browsing environment, or edit the page or content such that it can be properly displayed (e.g., according to the desired look and feel) on the second platform.

What is desired then, is a way to improve web content development.

SUMMARY

With the above in mind, it may be understood that what is particularly desired is to allow web content developers to repurpose or reuse previously developed pages or content, including the reuse of these pages or content to develop subsequent pages or content, where those pages or content may even be deployed across different platforms.

Even more specifically, it is desired to give users the ability to review and edit previously developed pages or content to select or edit the components of that previously developed content they wish to use, and the layout and presentation of the content for reuse, such that the content of the previously developed content may be reused according to a look and feel desired by a user. It is also desired to allow a user to perform this editing and review process in easy and straightforward manner whereby the user can easily see the content of the previously developed pages, such as a What-You-See-Is-What-You Get (WYSIWYG) editor.

Such solutions are technically difficult. As mentioned, it may be desirable to visually present the actual content in an editor such that a user can edit or select visually presented content for reuse. The presentation of content in an editor, however, hampers the ability of that editor (or other computer programs or software) to determine, select, parse or otherwise process the actual content that is to be reused, at least because it may be difficult to determine or process the relevant code desired for reuse.

Moreover, a user of a content editor must be given the ability to interact (e.g., select) with presented content to select and edit such content for reuse. In many cases, however, the user must be prevented from interacting with the functionality of the underlying presented content during an editing or selection process. For example, a user may wish to select or edit presented content for reuse. If this content contains links it may be desired to disable or prevent a user from selecting or activating these links during the editing or selection process.

To solve the aforementioned problems, among others, attention is now directed to the embodiments of systems and methods for web content development disclosed herein. Specifically, embodiments of web content development platforms as disclosed may provide the ability to convert previously generated web content to templates or components that may be subsequently reused to generate web pages or other content for use in a web site provider's site. In particular, embodiments may ingest Hyper-Text Markup Language (HTML) content and convert the HTML content into reusable components and templates.

It will be understood that content in other formats may likewise be ingested and converted according to embodiments herein. For example, Photoshop Document (e.g., PSD) content may be ingested and converted into reusable components and templates. In one particular embodiment, a pre-processor may be applied to certain types of content, such as PSD content, to convert such content into HTML. This resulting HTML can then be converted into reusable components and templates as discussed herein. Such pre-processing may be invisible to a user such that any pre-processing of certain types of content (e.g., PSD content) is invisible to a user and the user perceives only that provided content (e.g., PSD content) is converted to reusable components and templates.

In one particular embodiment, the HTML documents may be converted into templates for use with OpenText's Experience Studio for TeamSite product. The HTML may be processed to identify the elements therein and these elements saved as a component as defined by OpenText's LiveSite product. These components may be rendered and presented to a user along with an editor in a WYSIWYG interface. The user may use the WYSIWYG interface to select a component, modify the components, delete the component or accept the component. When the user is done, the selected or accepted (used interchangeably hereinafter) components are saved into a template that reflects the accepted components and their layout. This template can then be used to create subsequent pages.

In one embodiment, a web content development platform can include a processor and a data store and be coupled over a network to one or more user devices. The web content development platform can store an editor having a set of instructions including instructions executable by a browser on a user device to implement the editor. The web content development platform can provide the editor to a user device where it can be executed by the browser. The editor executing on the browser at the user device can receive HTML from a user and render the HTML in the browser executing the editor to present the rendered HTML in the browser.

The editor can then identify elements of the HTML and evaluate the identified elements of the HTML to determine standalone elements of the HTML. Each identified element may be evaluated based on a tag associated with the identified element to determine if the identified element is a standalone element. The editor can also create a component for each of the identified standalone elements by identifying a component type for the standalone element based on the HTML associated with the standalone element, creating the component of the identified component type and populating a datum of the created component with HTML from the corresponding standalone element. Created components can be identified in the rendered HTML presented by the browser and a determination made when a user has accepted the identified components. The editor can then create a template at the web content development platform that includes the identified components.

In some embodiments, wherein rendering the HTML is accomplished by the editor injecting the received HTML into the instructions of the editor such that the received HTML is rendered in the browser in association with execution of the editor by the browser.

In a particular embodiment, the instructions of the editor include instructions associated with an identifying pattern, and identifying elements of the HTML comprises obtaining a Document Object Model (DOM) associated with the rendered HTML from the browser executing the editor, and identifying all elements in the DOM that are not script, link or style tags and do not have the identifying pattern associated with the instructions of the editor.

In other embodiments, creating the template comprises inserting the identified components in the template according to a grid layout by assigning each of the identified components to a section of the grid layout according to a location of the identified component in a layout of the identified components presented in the browser.

In one embodiment, the components created for the standalone elements are maintained by the editor at the browser on the user device.

In a specific embodiment, a component type is a basic image component type, a basic content component type or a basic embed HTML component type.

In some embodiments, a corresponding mask is created for each created component and identifying the created components comprises rendering, by the editor, the corresponding mask in the browser executing the editor.

Embodiments may thus have the technical advantages of allowing WYSIWYG presentation of content in a (e.g., browser based) editor and the selection or editing of the content for reuse through creation of a template. Such technical advantages are obtained at least in part by the ability of the editor to differentiate the instructions of the editor from the HTML content provided by the user, even when the editor is rendering the content in the very same browser that is executing the browser. Moreover, such advantages are possible through the use of components that may be maintained by the editor at the user device while the components are being presented in the editor and edited or selected by the user. These components can later be saved at a web content development platform or used to create templates at the web content development platform. Additionally, such advantages may be obtained through the rules or conditions used to evaluate elements or tags of the HTML to determine standalone elements, component types or to make other determinations.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. As discussed above, it is desired to allow web content developers to repurpose or reuse previously developed pages or content, including the reuse of these pages or content to develop subsequent pages or content, where those pages or content may even be deployed across different platforms. It is also desired to give these web content developers the ability to review and edit previously developed pages or content to select or edit the components of that previously developed content they wish to use in easy and straightforward manner whereby the user can easily see the content of the previously developed pages, such as a WISY-WIG editor.

To those ends, among others, attention is now directed to the embodiments of systems and methods for web content development disclosed herein. Specifically, embodiments as disclosed may convert previously generated web content to templates or components that may be subsequently reused to generate web pages or other content for use in a web site provider's site. In particular, embodiments may ingest one or more Hyper-Text Markup Language (HTML) content and convert the HTML content into reusable components and templates.

In one particular embodiment, the HTML documents may be converted into templates for use with OpenText's Experience Studio for TeamSite product. The HTML may be processed to identify the elements therein and these elements saved as a component as defined by OpenText's LiveSite product. These components may be rendered and presented to a user along with an editor in a WYSIWYG interface. The user may use the WYSIWYG interface to modify the components, delete the component or accept the component. When the user is done, the accepted components are saved into a template that reflects the accepted components and their layout. This template can then be used to create subsequent pages.

Figure 1:
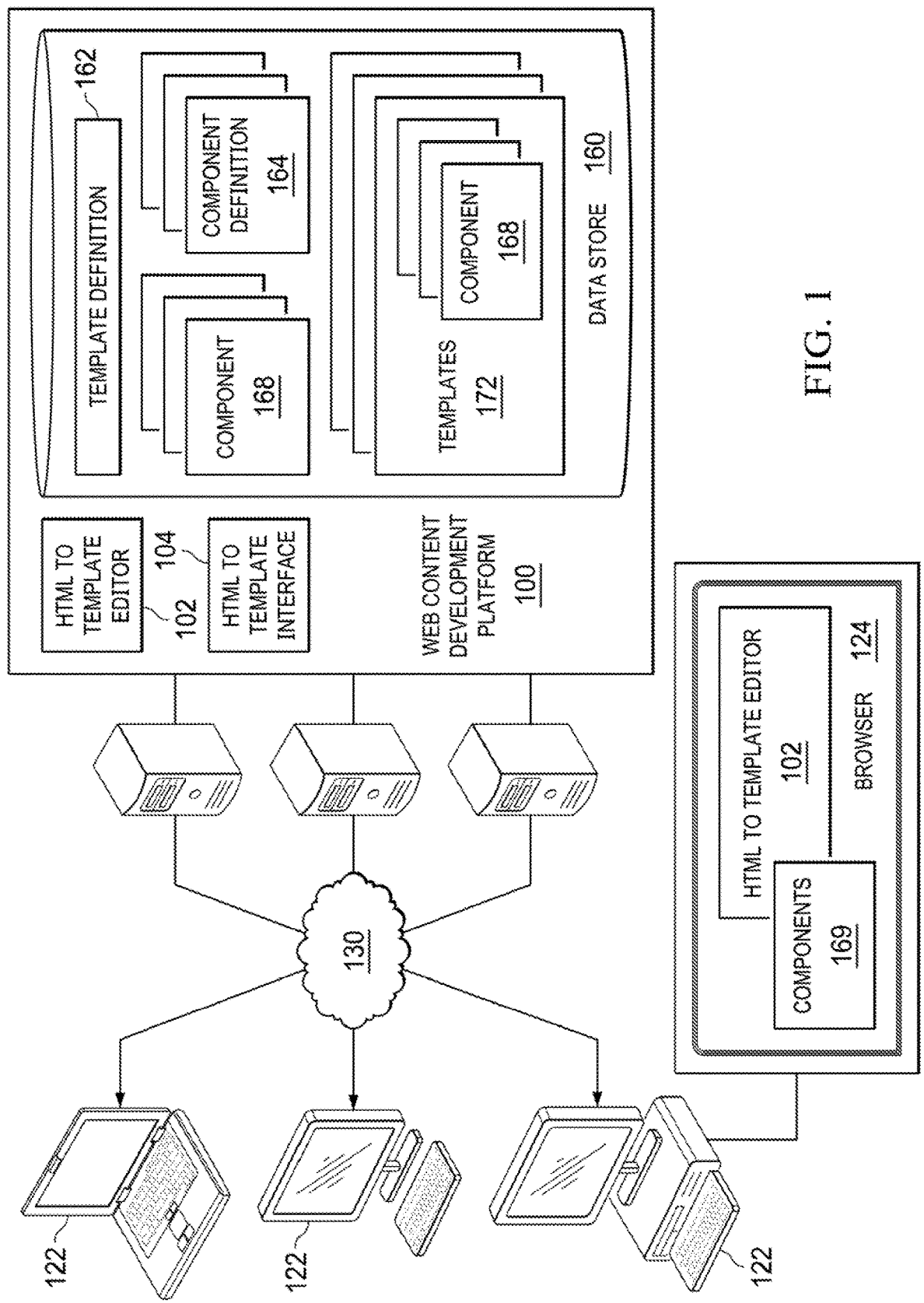
FIG. 1 is a diagrammatic representation of an architecture for web content development.

FIG. 1 depicts an embodiment of an architecture that includes one embodiment of a web content development platform 100 coupled to one or more user devices 122 over network 130. Web content development platform 100 may be part of, or include, a web content management system such as, for example, Open Text's Experience Studio for TeamSite product. Network 130 may be the Internet, an intranet, a wireless or wired network, a LAN, a WAN, some combination of these types of networks, etc. Such a web content platform 100 may be deployed internally within an enterprise on physical server computers (referred to sometimes as "hosted on-premise), may be hosted externally to an enterprise, may be hosted on one or more virtual servers, or may be hosted or deployed in a cloud based computing platform such as Amazon Elastic Compute Cloud, the Google Cloud Platform, Microsoft's Azure, etc.

The web content development platform 100 allows web content developers at devices 122 to compose, edit, review, publish or perform other tasks associated with the management, creation, editing, publishing or deployment, of web content. In particular, according to certain embodiments the web content development platform 100 may allow these web content developers to define components 168 and templates 172 that may be used to implement, or define content for, a web site. As an example, a component 168 may be a component as defined by Open Text's LiveSite product.

These components 168 and templates 172 may be XML files or portions thereof, and associated metadata that define the content and appearance of at least a portion of the web site. Components 168 may be discrete pieces of functionality for use in a web site or web page such as navigation menus, areas of dynamic or static content, web applications or the like. They are the building blocks from which pages (or templates) are created.

Specifically, in one embodiment, every component 168 is associated with content and appearance. The component 168 may be an XML document or portion (e.g., fragment or portion of an XML document) that has sections or tags that define the content (e.g., the actual content to be rendered for the component) and appearance of that component 168, or reference one or more external (to the component 168) sources or locations where the content or appearance definition may be located.

A segments section of a component 168 may have the appearance configurations and the data section under the segment section of the component XML holds the actual data that will be rendered. In particular, a data or "datum" field or tag within the component 168 may contain the content to be rendered. The appearance of a component 168 may be controlled through eXtenible Stylesheet Language (XSL) or tokenized HTML along with Cascading Style Sheets (CSS). Thus, in some embodiments the components 168 may have two rendering modes/skins—default HTML or XSL rendered.

A stylesheet section in the component XML may give information on how the component will be rendered. The stylesheet section marked as default within the component 168 may be used to render the component as HTML (e.g., if no other stylesheet is present or referenced).

Templates 172 may be XML documents that are predefined pages or page fragments that may be defined to include one or more components 168. The templates 172 may for example, embed or associate the included component 168 with a grid layout such as that defined by the Bootstrap grid system or the Foundation grid system. These templates 172 may be used to apply a common set of components (such as a navigational c-clamp or the like) across many pages. For example, multiple web pages may be created from a template 172 that already includes a set of desired components 168 (e.g., header, footer, navigation components). For each of these multiple pages, a web developer may only need to add the appropriate additional content for that particular page.

The pages authored through the web content development platform 100 can be deployed to a live web site through the use of a runtime engine or appropriate web server or the like. The pages generated from templates 172 may, for example, be rendered dynamically by a runtime engine. If the web site or portions thereof are static, web pages (e.g., HTML or the like) may be generated from the pages or templates 172 and these generated web pages deployed into the runtime environment of the web site.

Web content development platform 100 may thus provide a variety of interfaces or avenues by which a web content developer can generate components 168 or templates 172. As discussed above, it may be particularly desirable to allow a web content developer to utilize a previously generated web page or set of web pages and associated content, style definitions, etc. to be repurposed. In the context of the web content development platform 100 then, it would be desirable to allow such existing web pages to be converted into components 168 and templates 172 for use with the web content development platform 100.

To that end, among others, web content development platform 100 includes an HTML to Template editor (or just editor) 102 and a corresponding HTML to Template interface (or just interface) 104.

Figure 2:
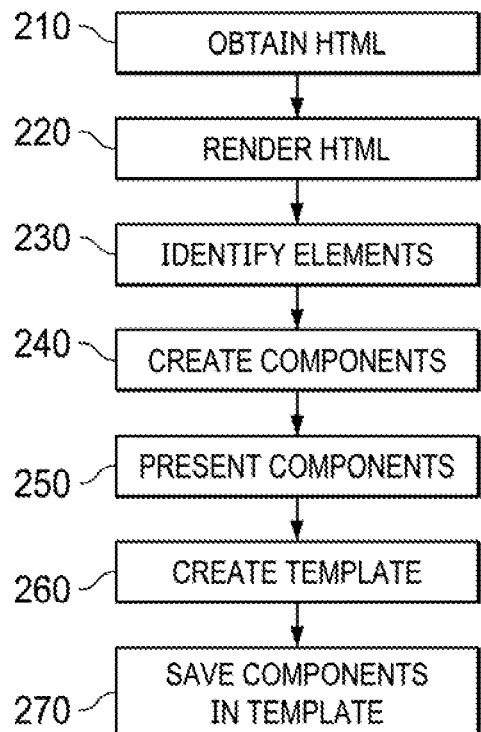
FIG. 2 is a flow diagram of an embodiment of a method for creation of reusable templates from HTML.

The operation of embodiments of the editor 102 and interface 104 may be better explained with reference also to FIG. 2. The HTML to Template editor 102 may be a browser based editor capable of rendering and operating in a browser 124 such as those known in the art, including for example, Internet Explorer, Chrome, Firefox, Safari, Opera, etc. In one embodiment, the editor 102 may be written in HTML and JavaScript (e.g., jQuery) such that it may be rendered by a browser 124 and utilize JavaScript (e.g., jQuery) to query the Document Object Model (DOM) associated with content rendered by the browser 124 at a device 122. Other implementations of editor 102 are possible and are fully contemplated here. For example, while jQuery is a well-known cross-platform JavaScript library, and thus may be conveniently utilized in certain embodiments, other embodiments may utilize other types of libraries or code, whether JavaScript or otherwise, to equal efficacy.

To allow the differentiation of the elements of the HTML to Template editor 102 from elements of rendered content in the DOM not associated with the editor 102, the elements, CSS classes or identifiers of the elements of editor 102 may be given a special pattern (also referred to as an identifying pattern). For example, they may be tagged or otherwise given a special pattern (e.g., a CSS pattern) that includes "html-as-template", such as "identifier-import-html-as-template."

The HTML to Template editor 102 may be downloaded by a user at a device 122 and executed or rendered in the browser 124. For example, the user may access the web content development platform 100 through his browser 124 (e.g., at a particular URL). When the user is presented with an interface by the web content development platform 100 the user may be presented with the opportunity to select the HTML to Template editor 102 at which point the editor 102 is sent to the user's browser 124 where it is rendered or executed (used interchangeably herein in this context when referring to a browser) by the browser 124.

When the editor 102 is executed in the browser 124 it may provide an interface in the browser 124 through which a user may provide one or more HTML documents to be converted into a template or components. In certain embodiments, the user may provide a location of one or more HTML files and their associated dependencies (e.g., image source files, stylesheets, etc.) through the interface of the HTML to Template editor 102. In one embodiment, the editor 102 may provide a drag and drop interface by which the user may drag these HTML files into the interface. For example, the HTML files and their associated dependencies may be packaged in a .zip file and the .zip file dragged and dropped into the interface of the editor 102.

The HTML files may be uploaded by the editor 102 to the web content development platform 100 through one or more calls by the editor 102 to the interface 104 provided by the web content development platform 100. When the HTML files are received at the web content development platform 100 through the HTML to template interface 104, the HTML files can then be stored in the data store 160 of the development platform 100. Additionally, the editor 102 at the browser 124 can also access the user specified files when the user indicates that such HTML files should be converted to a template. In one embodiment, the editor 102 may obtain the HTML files (or portions thereof) by calling the interface 104 of the web content development platform 100 to obtain the HTML files (e.g., the files, the originally uploaded .zip file, etc.). In another embodiment, the editor 102 may retain a copy of the HTML (or other) files provided by the user as they are uploaded to the web content development platform 100.

To illustrate an example that may be useful herein, a user may drag a file called "simple.zip" into the interface provided by editor 102, where the simple.zip file contains a document entitled simple.html with the following HTML:

```
<!doctype html>
<html>
 <head></head>
 <body>
   <div>
     This should be identified as basic content
   </div>
   <br>
   <div>
     <img src="simple dependencies/Desert.jpg"
style="visibility:visible;width:250px">
   </div>
   <br>
   <footer>
   <div>
     This is the footer @Copyright my company
   </div>
   </footer>
 </body>
</html>
```

Figure 6:
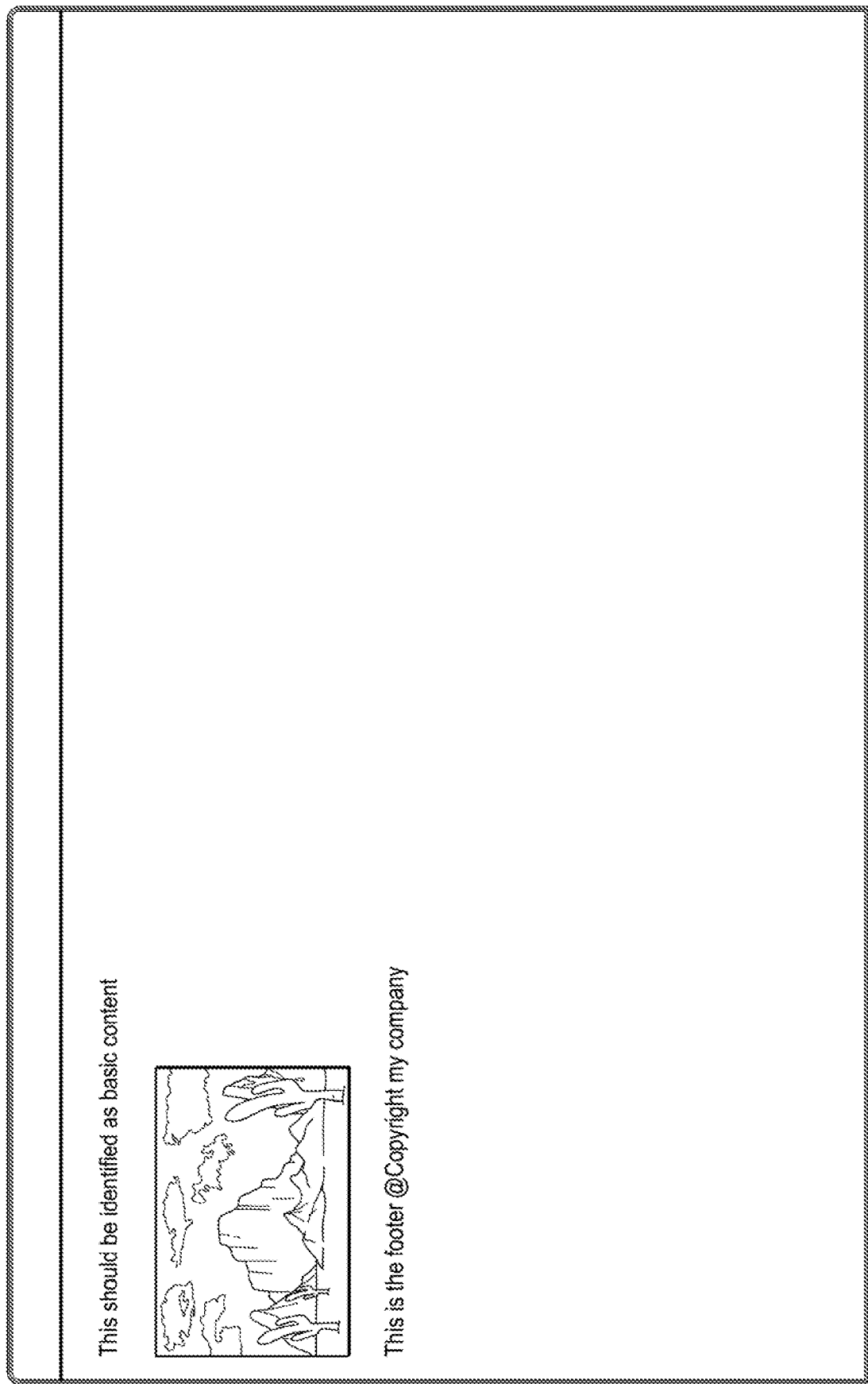
FIG. 6 is one embodiment of a screenshot for a rendering of an example HTML file.

Thus, the simple.html file contains three items: a div with the text "This should be identified as basic content"; a div with an img; and a footer with a div containing text "This is the footer @Copyright my company". The simple.zip file may also contain a folder called "simple dependencies" containing an image file called "Desert.jpg". A rendered (e.g., by a browser 124) view of the contents of such a simple.zip file (e.g., a rendering of the "simple.html" file and "Desert.jpg") is depicted in FIG. 6.

The editor 102 can thus obtain the HTML and the dependencies from the provided file (STEP 210), for example, by unzipping the provided .zip file. The HTML can then be rendered by the editor 102 at the browser 124 (STEP 220) using the dependencies (e.g., as provided in the .zip file). As the editor 102 is itself an HTML based editor, the editor 102 may use JavaScript such as jQuery or the like to inject the obtained HTML into the browser 124 to render the HTML content in association with the editor 102.

The elements in the rendered HTML can then be identified by the editor 102 (STEP 230). In particular, in one embodiment the editor 102 may access the DOM (e.g., using jQuery or the like) and identify the elements of the rendered HTML based on the tags of the elements (e.g., those elements with tags that do not have a special identifier or CSS pattern associated with the editor 102). The identified elements can then be used to create components (STEP 240). These components may be created by evaluating the identified elements to determine which elements should be standalone elements. Once the standalone elements are identified the editor 102 may create components 169 for these elements. These components 169 may be simple JavaScript objects maintained by the editor 102 on the user device 122 at this point.

Alternatively, in one embodiment, the editor 102 may create a component for a standalone element by identifying the element as a particular component type and requesting that a component of that type be created through interface 104 of web content development platform 100. This request may include data (e.g., HTML data, stylesheet data, etc.) needed for the component. The web content development platform 100 may obtain a component definition 164 for the component type and use the appropriate component definition 164 as a basis for creating the component by saving a copy of the component definition 164 as the component and populating the XML of the created component.

Component definitions 164 may include the definitions for one or more types of components. These component types may be a basic image component type, a basic content component type and a basic embed HTML component type. The component definition 164 for a type may include the XML that will be included or otherwise define every component of that type.

Thus, to create a component 168, the component definition 164 may be saved as a component 168 and populated with data associated with a corresponding element in the ingested HTML (e.g., the HTML provided by a user associated with an identified element). Each of the component types 164 may have the datum field (or tag) that may be populated in an associated component of that type based on a corresponding (e.g., identified) element being used to create the component.

Specifically, in one embodiment components 168 may have two rendering modes/skins as discussed, default HTML or XSL rendered. The "stylesheet" section in the component XML gives information on how the component 168 will be rendered. The stylesheet marked as default in the component 168 is used to render the component as HTML. The "Segments" section in the component XML has the appearance configurations and the "Data" section under the "Segments" section of the component XML holds the actual data that will be rendered. For example, a basic image component type may gave a datum called IMGSRC, where an image tag that includes the path and description of an image for a component may be included; the basic content type component may include a datum named CONTENT where text for a component may be included; and the basic embed HTML component type may include a datum called HTML where text such as HTML for a component may be included. Examples of XML for these component types is given in Appendix A.

Once the components (e.g., either components 169 or 168) have been created for the identified standalone elements (STEP 240), the editor 102 may present (or identify) these components in the interface provided by the editor 102 through browser 124 by rendering or identifying the data or datum of the created components (STEP 250). These components may, for example, be presented in conjunction with an overlay that prevents a user from interacting with the underlying content (e.g., clicking on links or the like) of the presented component by intercepting events associated with the display of the browser 124 and providing them to the editor 102.

The user is thus given the ability through the interface of the editor 102 presented in browser 124 to accept the presented components, delete a presented component or edit the presented components. If the user edits a presented component the data or datum of the edited component (e.g., component 169) is changed in accordance with the edit and the component 169 is presented back through the interface of the editor 102 such that the current state of the component 169 is reflected in the interface of the editor 102.

Again, alternatively, in one embodiment the editor 102 may edit a component by requesting that the component 168 be edited through interface 104 of web content development platform 100. This request may include data (e.g., HTML data, stylesheet data, etc.) needed for the editing of the component (e.g., an indication of the edit to be performed). The web content development platform 100 may obtain the appropriate component 168 and edit it accordingly.

Once the user has accepted all the components currently presented in the interface of the editor 102 a template 172 containing those components 168 may be created (STEP 260). In particular, the presented components may be saved in a template 172 where they are organized according to a grid layout of the template 172 (e.g., a Bootstrap grid layout or a Foundation grid layout) (STEP 270).

In one embodiment, the editor 102 may create the template 172 through one or more requests to the interface 104 of the web content development platform 100. This request may include data (e.g., HTML data, stylesheet data, identification of components, etc.) needed for the creation of the template 172 and associated component 168 of the template 172. The web content development platform 100 may obtain a template definition 162 for the template and use the definition as a basis for creating the template 172 by saving a copy of the template definition 162 as the template 172. The XML of the created template 172 can then be populated with the data (e.g., HTML, CSS, etc.) associated with the identified components 168. As discussed above then, for each of the accepted components (e.g., accepted by the user in the interface of the editor 102) a corresponding component 168 may be created in the template 172 by determining a corresponding component definition 164 and populating the template 172 with the XML of the component definition 164. This XML included in the template 172 may, in turn, be populated with data associated with the corresponding component (e.g., the datum of the component may be populated, etc.) to create the component 168.

Figure 3:
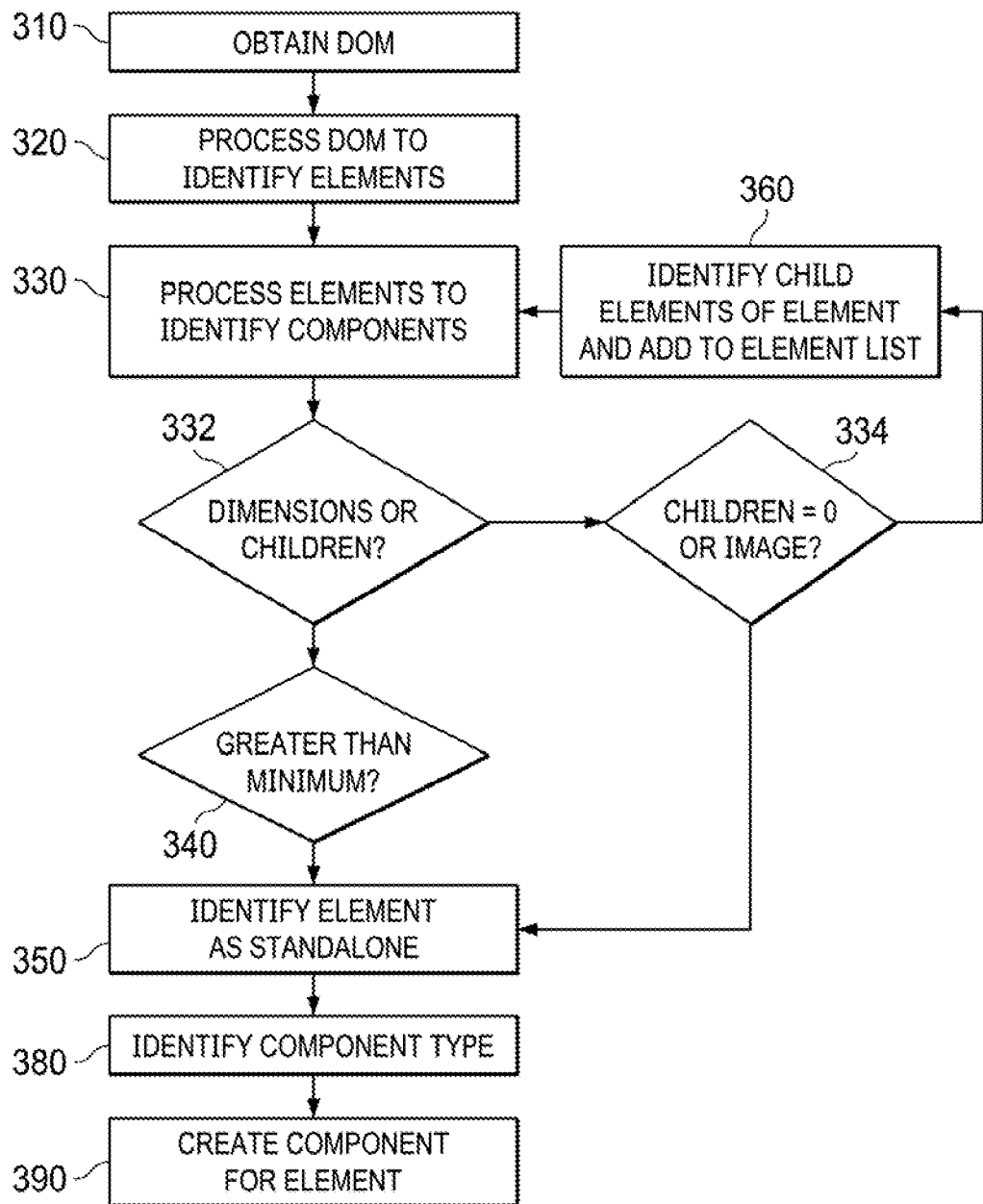
FIG. 3 is a flow diagram of an embodiment of a method for identification and creation of components.

The functioning of embodiments of an HTML to Template editor 102 may be better explained with reference to FIGS. 3 and 4. Looking first at FIG. 3, a flow diagram for one embodiment of a method for identifying components based on rendered HTML by an editor application is depicted. As discussed above, when HTML (and dependencies) are provided by the user (e.g., in a .zip file as discussed above), the provided HTML can then be rendered by the editor. As the editor is itself an HTML based editor, the editor may use jQuery or the like to inject the obtained HTML into the browser to render the HTML content in association with the editor. For example, in one embodiment, the editor may write the received HTML into the HTML of the editor such that the browser renders both the editor and received HTML (e.g., renders the received HTML in the context of the editor).

In particular, in one embodiment once the HTML is injected into the browser, the editor may obtain the DOM (e.g., from the browser in which it is executing using jQuery or the like) (STEP 310) and process the DOM to identify the elements of the rendered HTML based on the tags of the elements (STEP 320). Specifically, the HTML may be inspected by going through the entire DOM and identifying all elements that are visible and are not script, link and style tags and do not have the CSS class or identifier of the special pattern associated with the editor (e.g., "identifier-import-html-as-template"). In this manner, the elements in the DOM from the HTML (e.g., as provided by the user) can be differentiated from the elements of the editor itself.

For example, the following snippet of HTML shows an example overlay div for a mask that may be created for an identified component by an editor. These masks may be used, for example, as transparent overlays by the editor to prevent a user from interacting with rendered components. Thus, while these may be created at a later point (e.g., later than the initial identification of elements from the DOM), these types of page elements (e.g., with the "class="identifier-import-html-as-template"") would not be identified as part of the provided and rendered HTML.

```
<div   data-identifier-view="mask"   data-identifier-
    role="mask-insert-after"    class="identifier-import-
    html-as-template" style="position: fixed; top:0; left:0;
    width:100%;   height:100%;   background:transparent;
    z-index:1999999999;"></div>
```

The identified elements (e.g., as identified from the DOM) can then be processed to identify which elements (e.g., snippets of HTML) can be considered components (STEP 330). For example, the identified elements may be evaluated according to one or more rules to determine which snippets of the HTML can be considered as components. These rules may include, for example, preset conditions that the editor looks for to decide which snippets of the HTML can be considered as components. These might include a minimum or maximum width or height, or a maximum number of children. Other rules or conditions are also possible. The values for these conditions may be defined by a user or an administrator of editor 102.

For example, in one embodiment, these rules or conditions are set to the following values:
minimum width—40 px
maximum width—999999, // "unbounded" by default
minimum height—20 px
maximum height—600 px
max children—7

Accordingly, for each of the page elements identified from processing of the DOM (STEP 320), the width, height and number of children is calculated by editor 102 using the outerWidth, outerHeight and children calls of jQuery. The list of page elements can then be evaluated. For a page element in the list of elements, it can be determined if the height is greater than the maximum configured height or the width is greater than maximum configured width or the number of children is more than the max configured children (STEP 332). If none of these conditions is met, then if the number of children is zero or the element is an image, then this element is identified as a component (e.g., standalone component) (STEP 334). Whether an element is an image can be verified by a method that, given a jQuery element returns a map of image data for the element if it is an image or has a background image of at least 10×10.

If, however, there are identified children of the element that are not an image (STEP 334), the element is larger than configured maximums and should be further broken down. The elements (e.g., children elements) of the element are identified and added to the element list for evaluation (STEP 360). In one embodiment, a recursive call can be made to same method using the page elements identified from this element.

If the dimensions of the element are less than or equal to the configured maximums and the number of children is less than or equal to the maximum number of children (STEP 332) it can be determined if the dimensions are greater than or equal to the minimum dimensions (STEP 340). If so, this element is identified as a component (e.g., standalone component) (STEP 350). In one embodiment for example, if the width of the element is greater than or equal to the configured minimum width and the height of the element is more than configured minimum height that means the current element is within the configured minimum and maximum width and height and is marked as a component. For example, in the simple html, this page element is identified as a component—

```
<div>
    This should be identified as basic content
</div>
```

Once a component is identified it is then created using the element html. For example, the component information (e.g., the HTML or stylesheet data for the component) is stored locally in a JavaScript array. The component type can then be identified (STEP 380). In one embodiment, the component category information is gathered, if an image element then the component gets identified by the editor as a basic image component type. If the element is just plain text and not one of enumerated set of the common HTML elements like div, table, header, footer or other configurable HTML element identifier or element, then the component is categorized by the editor as a basic content component type. Otherwise the element gets classified by the editor as a basic embed HTML component type.

Once the component type of the identified element is identified. The component for that element may be created (STEP 390). In particular, in one embodiment, a JavaScript component may be created and maintained by the editor 102 at the user's device. In particular, a JavaScript component may be stored in a JavaScript array locally by the editor 102.

Alternatively or additionally, the component may be created at the web content development platform through one or more requests from the editor 102. The creation of the component may thus involve obtaining the component template for that component type and saving it as a component. The fields of that component may be populated with the HTML, text, image source, stylesheet information or other data from the element.

With regards to simple.html, if this example was processed according to an embodiment of the method, three components would be identified and stored with the information as below—

```
Component: 0
Component Type:
HTML:     <div>
    This should be identified as basic content
</div>
Datum: This should be identified as basic content
Component: 1
HTML:     <div>
<img src="simple dependencies/Desert.jpg"
style="visibility:visible;width:250px">
</div>
Datum: Image Path:
"http://16.103.1.155/iw/cci/meta/no-injection/iw-
mount/default/main/sampada/WORKAREA/default/
importHTML/site1/simple_dependencies/Desert.jpg"
```

```
Component: 2
HTML:    <footer>
           <div>
    This is the footer @Copyright my company
</div>
</footer>
Datum: <footer>
<div>This is the footer @Copyright my company</div>
</footer>
```

Once the components of the ingested HTML have been identified and created by editor 102, the editor 102 may present the identified components to the user in the interface of the editor for editing or inclusion in a template. In particular, in one embodiment the editor 102 may create a corresponding mask for each one of the created component, where the mask is intended to overlay the corresponding component in the interface presented by the editor. The mask is associated with editor 102 and is transparent allowing the user to see the underlying HTML component but preventing the user from interacting with the HTML of the corresponding component.

Moreover, the mask may identify the component (e.g., by outlining the identified component) and include a menu associated with the editor 102 and the corresponding component, allowing the user to accept the underlying component, delete the underlying component or edit the underlying component. If the user edits the underlying component, the datum of the corresponding component may be altered by the editor 102 and the component re-rendered in the interface such that the user can substantially in real-time and in a WYSIWYG manner see his edits.

Figure 4:
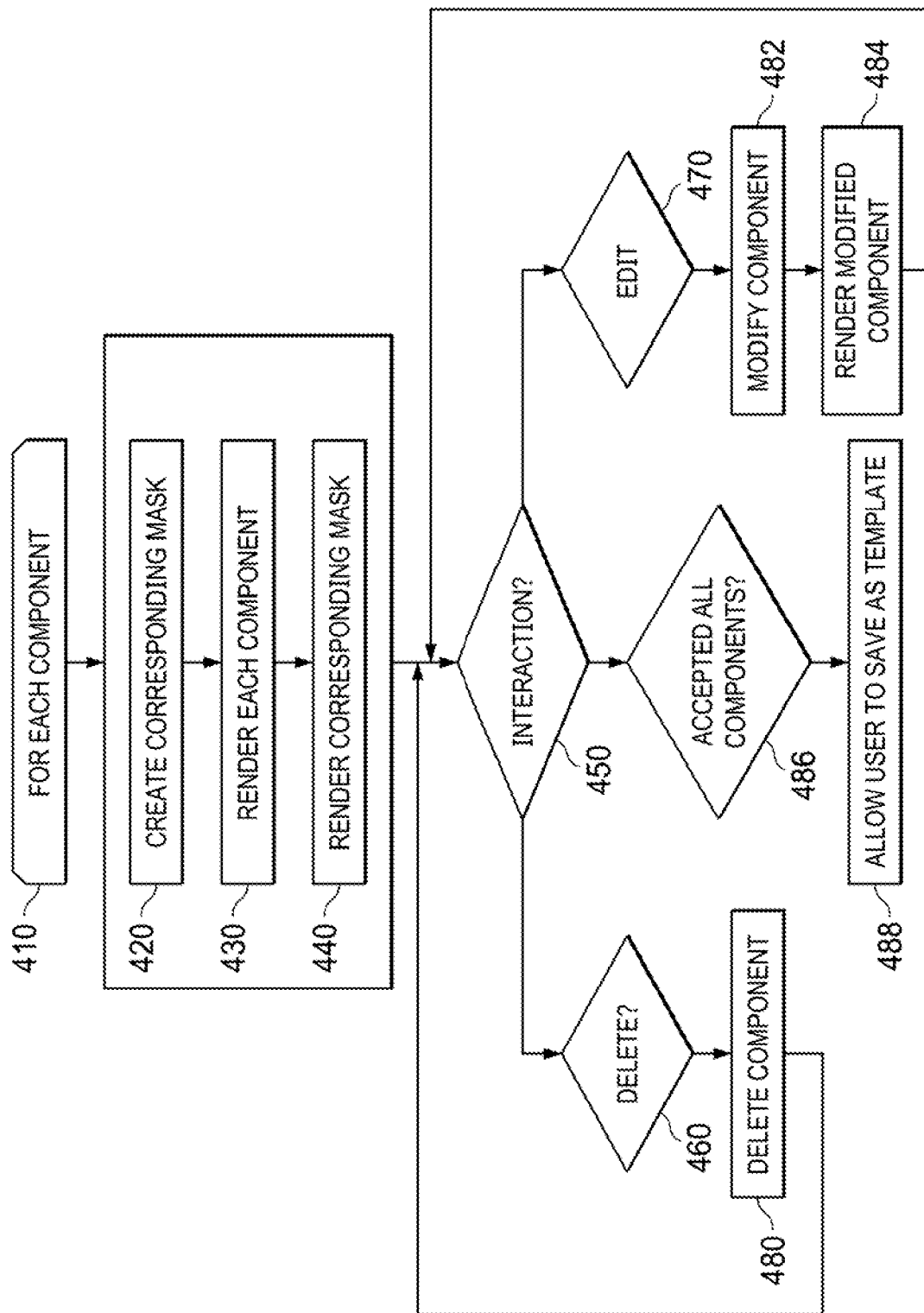
FIG. 4 is a flow diagram of an embodiment of a method for the presentation of components and creation of templates in an editor interface.

FIG. 4 depicts a flow diagram for one embodiment of a method for presenting an editing interface for template creation that includes components and corresponding masks. For each component (LOOP 410) a mask HTML is created so that the original component HTML gets masked with borders and a menu (STEP 420). The mask is the positioned on the corresponding component (e.g., given the same or slightly larger dimensions and the same or similar location on the page). In this manner, the user cannot interact with the underlying HTML (e.g., the HTML of the presented component) but has to interact with the mask instead. An example of a mask div is described above. In one embodiment, the menu on each component mask allows user to modify the component html, delete the component or accept the component.

Figure 7:
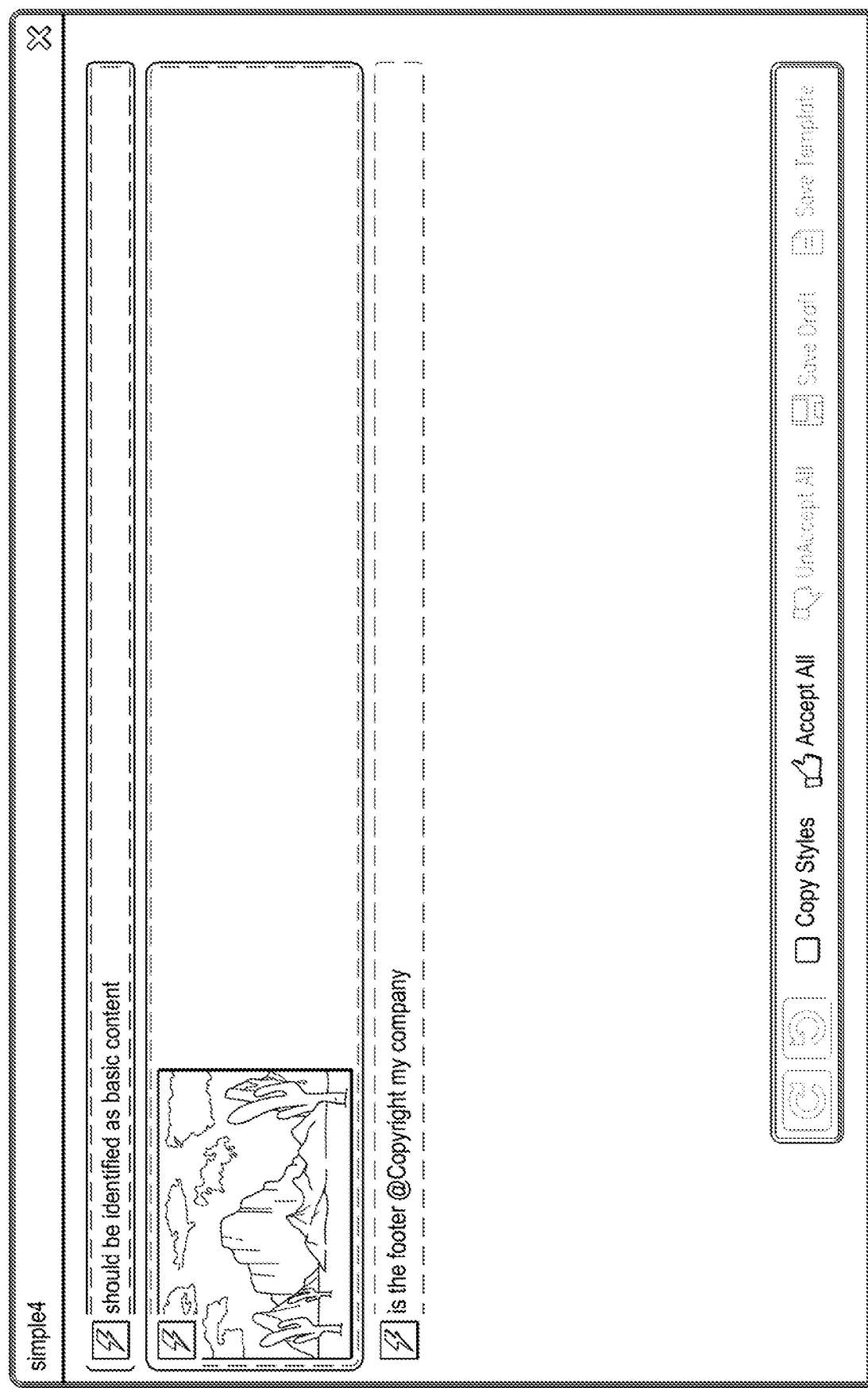
FIG. 7 is one embodiment of a screenshot for an editor interface for used with an example HTML file.

Accordingly, the components and the masks may be rendered in the editor (STEPs 430, 440). FIG. 7 depicts one embodiment of an editing interface presented by an editor for the example simple.html presented herein, including both the presented three components determined for simple.html and corresponding masks for those components.

Interactions with the masks for each component can then be determined (STEP 450). If the interaction is a delete action (STEP 460) the component (e.g., corresponding component 169 or 168) may be deleted by the editor 102. The page can then be re-rendered such that the component that was just deleted is not presented to the user in the interface (STEP 480). If the user edits (e.g., modifies) the underlying component (STEP 470), the datum of the corresponding component (e.g., component 169 or 168) may be modified accordingly by the editor 102 (STEP 482) and the component re-rendered in the interface (STEP 484). In this manner, the editor 102 may allow a user to view and edit component for a template in a real-time and WYSIWYG manner. Such real-time editing and viewing may be facilitated, for example, by editing and re-rendering components 169 maintained by the editor 102.

Figure 8:
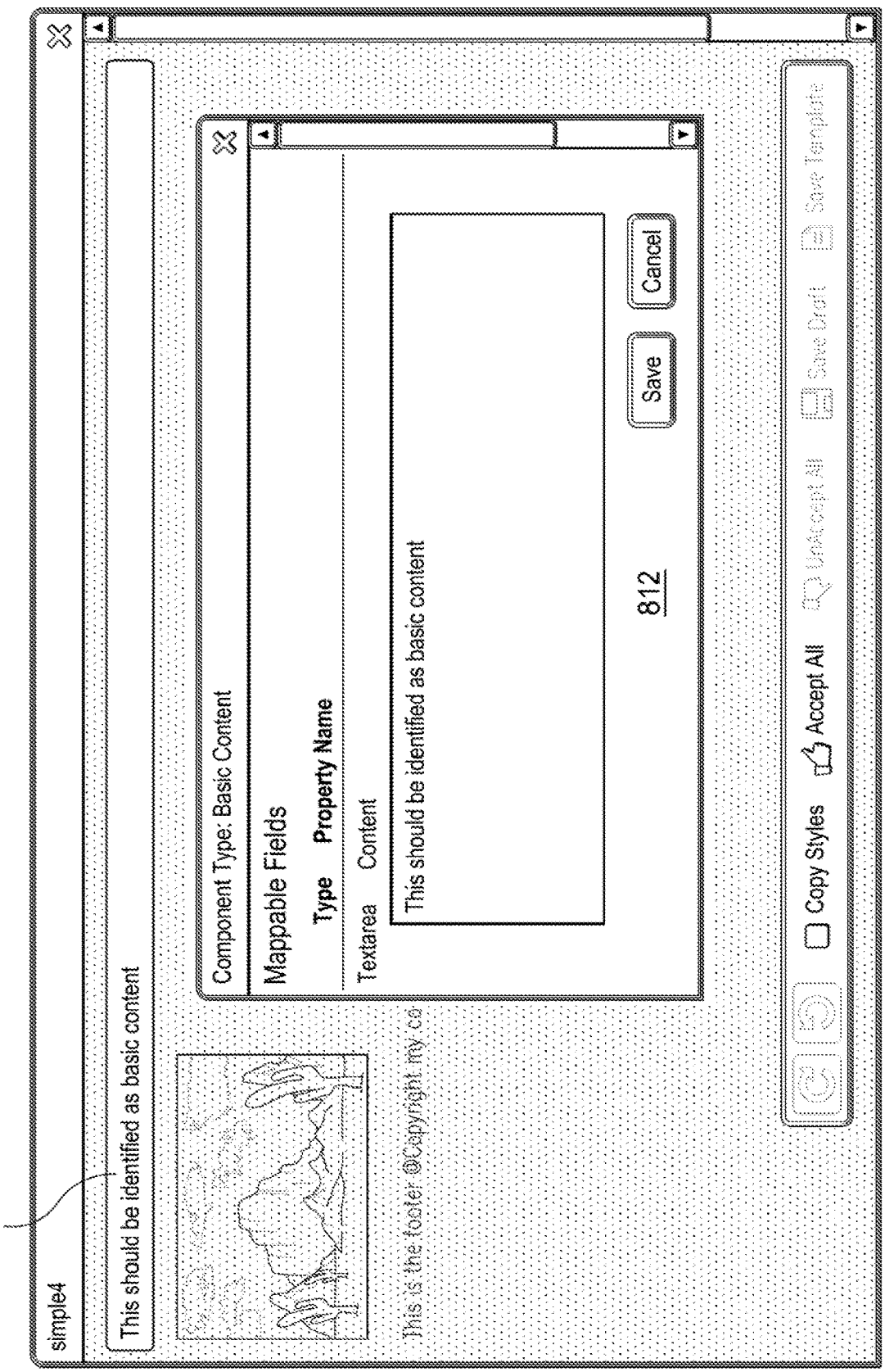
FIGS. 8-10 are embodiments of screenshots for an editor interface used with an example HTML file.
Figure 9:
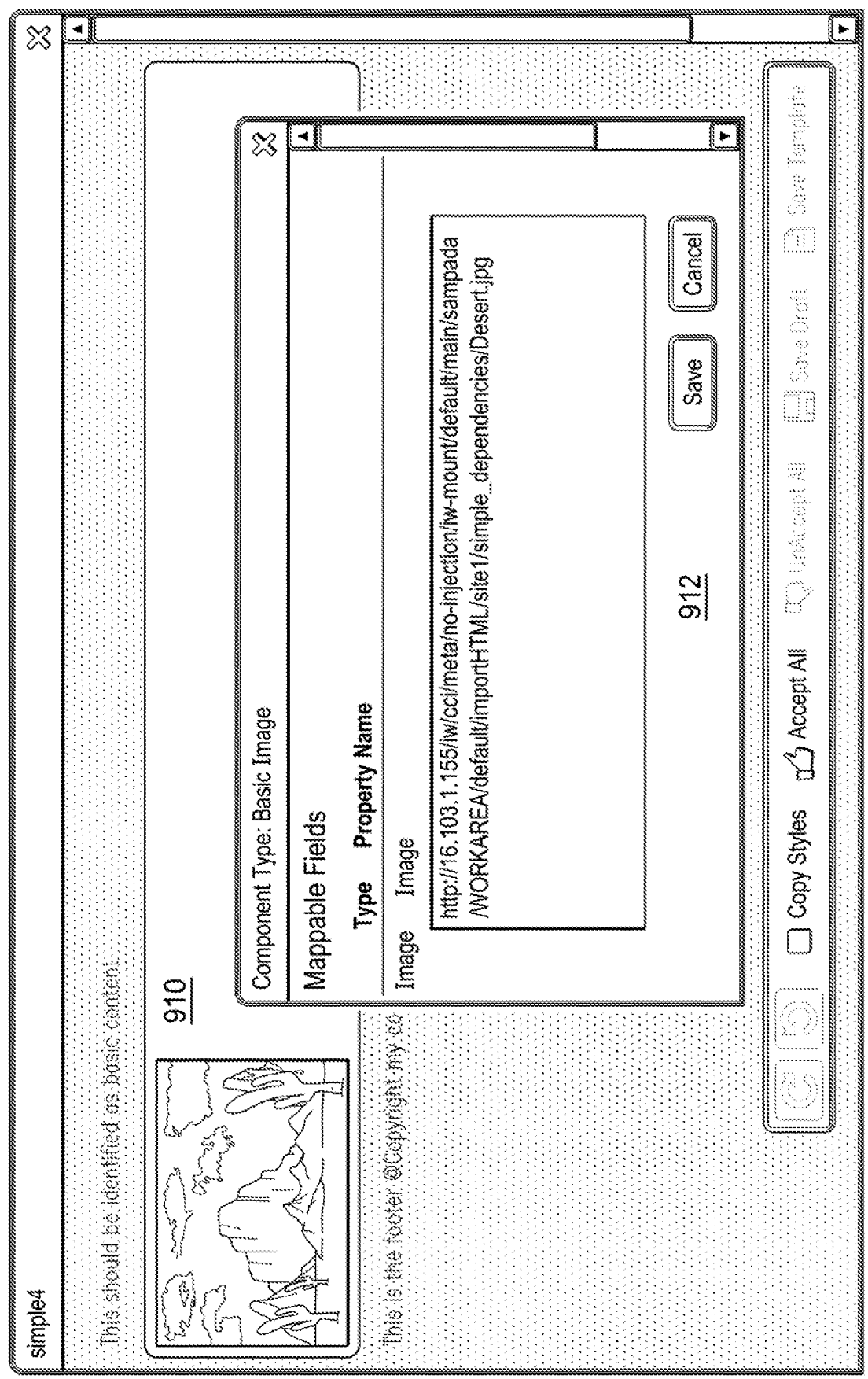
Figure 10:
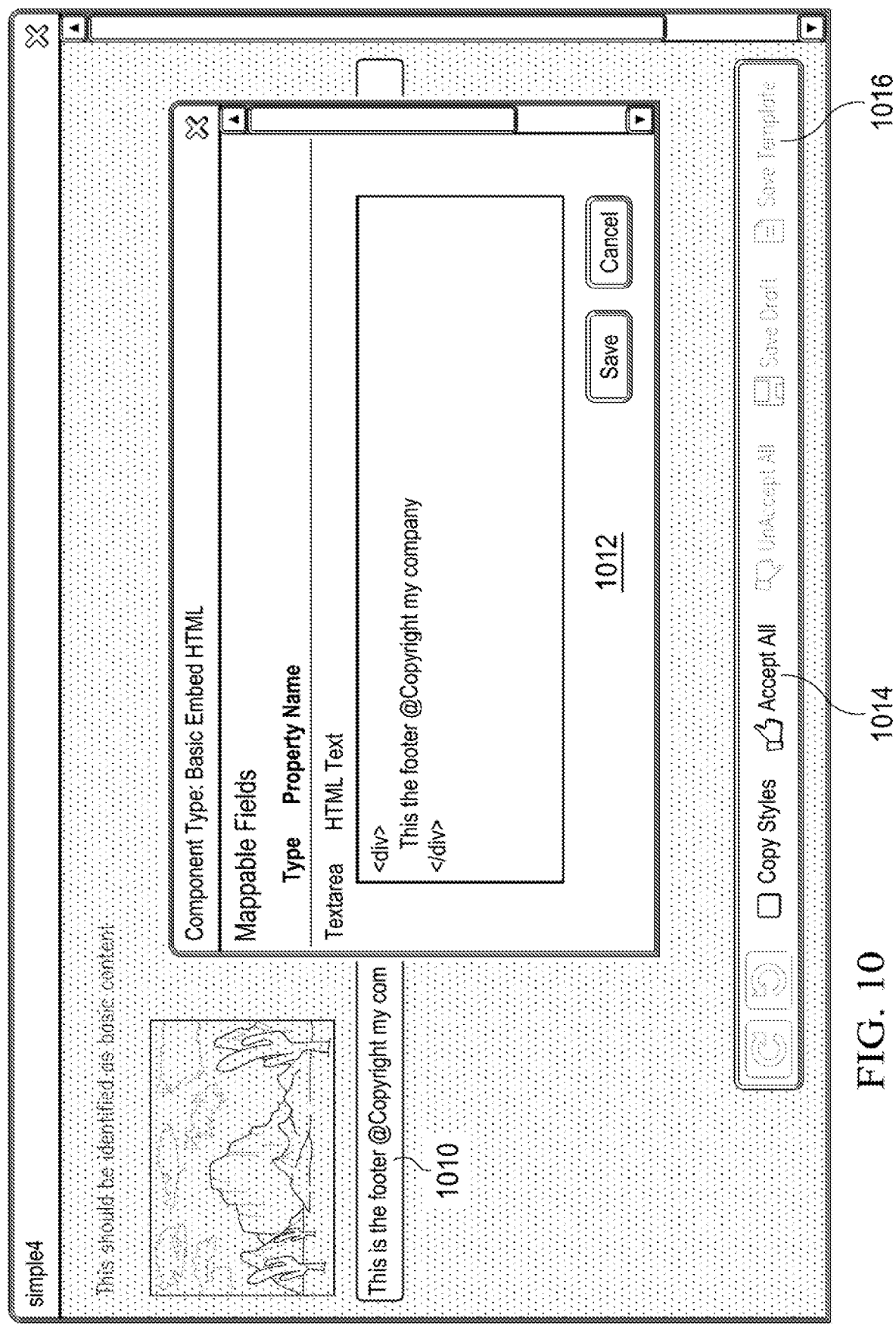

FIGS. 8-10 depict interaction of a user and the editor with the various components presented through the interface for simple.html illustrating the properties of those components. For example, in FIG. 8, a user has selected the basic content component 810 with the datum "This should be identified as basic content." An editing interface 812 may pop up when the user selects a certain menu item (e.g., "edit" or "view") associated with that component. Through the interface 812 the user may be given the ability to edit the datum of the presented component.

In FIG. 9, a user has selected the basic image component 910 with the datum of the image source. An editing interface 912 may pop up when the user selects a certain menu item (e.g., "edit" or "view") associated with that component 910. Through the interface 912 the user may be given the ability to edit the datum of the presented component 910. Similarly, In FIG. 10, a user has selected the basic embed HTML component 1010 with the datum of the div tag including the text "The is the footer @Copyright my company". An editing interface 1012 may pop up when the user selects a certain menu item (e.g., "edit" or "view") associated with that component 1010. Through the interface 1012 the user may be given the ability to edit the datum of the presented component 1010.

At some point then, the user will conclude editing or selection of components to include in the template using the interface of the editor and will accept all the components currently being presented on the interface of the editor 102 (STEP 486) (e.g., by hitting the "Accept All" button 1014 as shown in FIG. 10). The editor 102 can then allow the user to save the presented components as a template (STEP 488). For example, in one embodiment, once the user accepts all the components using the menu on each individual component or the "Accept All" button 1014 in the main toolbar of the editor, the "Save Template" button 1016 in a main toolbar of the interface of the editor is enabled. When the user now clicks on the save template button 1016 the identified components may get placed in the template in the grid layout. The grid layout can be chosen initially when creating the template from HTML as a Foundation based grid or a Bootstrap grid, or may be chosen at a later point, such as when a user selects to save the components as a template.

Figure 5:
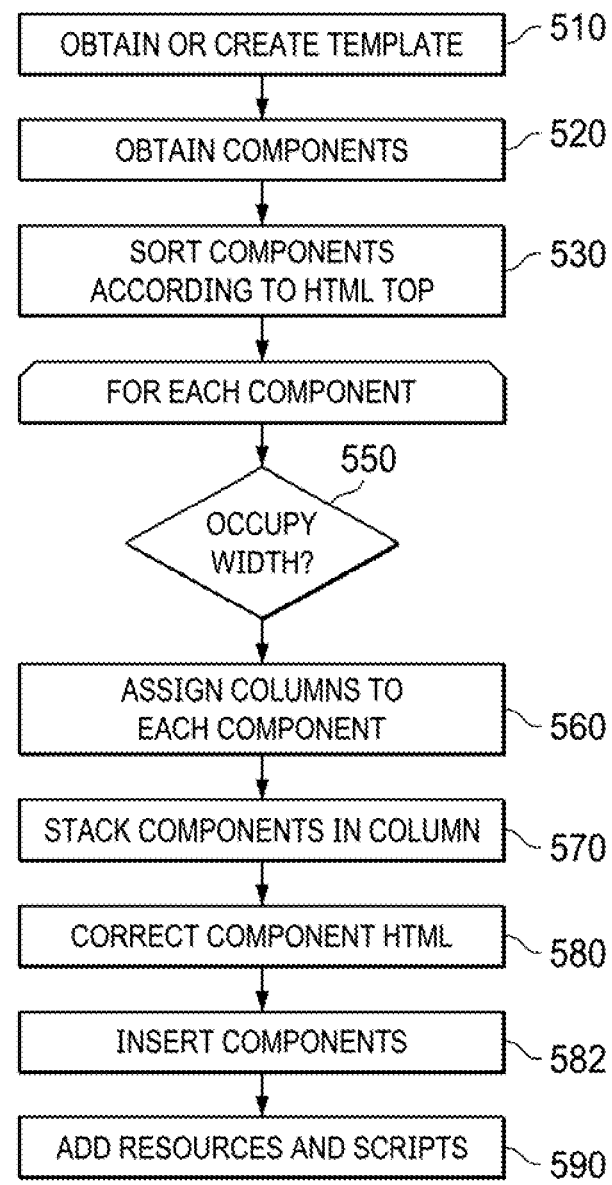
FIG. 5 is a flow diagram of an embodiment of a method for inserting components in a template according to a layout.

FIG. 5 depicts one embodiment of a method for creating a template, including the placing of components in a template according to a grid layout. Initially, the template 172 may be created or obtained (e.g., if previously created) (STEP 510). The creation of a template 172 may entail obtaining a template definition 162 for the appropriate type of template (e.g., a Foundation based or Bootstrap based template) and saving a copy of that definition as a template 172.

In one embodiment, a PageType section in the template holds the layout information. The layout is either a Foundation or Bootstrap grid. The EmbeddedLayout section of the template has the details of the template 172. In the example below, the components of the template are stacked in a single column in the same section and the row is stretched across the width of the template.

```
<PageType>
    <Id>htm15</Id>
    <Layout>embedded-layout</Layout>
    <EmbeddedLayout><![CDATA[<div class="iw_section"
        id="sectionivse10qp">
<div class="row iw_row iw_stretch" id="rowivse10qq">
  <div class="columns iw_columns large-12" id="colivse10qr">
    <div class="iw_component" id="iw_comp1479751821312">
      $COMPONENT[1479751821312]
    </div>
    <div class="iw_component" id="iw_comp1479751821316">
      $COMPONENT[1479751821316]
    </div>
    <div class="iw_component" id="iw_comp1479751821320">
      $COMPONENT[1479751821320]
    </div>
  </div>
 </div>
</div>]] ></EmbeddedLayout>
    </PageType>
```

The template 172 is now ready to be populated with the data for the components 168 which are to be part of the template 172. These components 168 may, for example, correspond to components 169 maintained by editor 102 and accepted by the user using the editor 102.

The components which are to form part of the template can then be obtained when the user accepts all the components currently being presented in the editor interface (STEP 520). These components may be maintained by the editor 102 during the editing process (e.g., with locally on the user device or at the web content development platform or both) or may be identified. In one embodiment, these components can be obtained using the DOM for the rendered interface, as the components are being presented in the interface by the editor 102. In particular, the components (or desired properties thereof) may be obtained by processing the DOM similarly to the identification of components as described above. The rendered locations and styles for these components can then be used to determine into which section and column of the grid layout of the template to place the component.

Specifically, based on the rendered location all of the components currently being presented in the interface can be sorted according to their HTML top (STEP 530). Components with the same top may be assigned the same section. For example, with respect to the three example components associated with the example simple.html previously discussed herein, after this step is completed the three components would be assigned as follows:

Component: 0, Section: 0, Column: 0, IndexInColumn: 0, stretch:false
Component: 1, Section: 1, Column: 0, IndexInColumn: 0, stretch:false
Component: 2, Section: 2, Column: 0, IndexInColumn: 0, stretch:false For each of the components it can then be determined if any of the components occupies the width of the window (STEP 550). If a component occupies the width of the window then it is added in the grid layout of the template 172 as a stretched section. For the example simple.html the output of this step is as below.

Component: 0, Section: 0, Column: 0, IndexInColumn: 0, stretch:true
Component: 1, Section: 1, Column: 0, IndexInColumn: 0, stretch:true
Component: 2, Section: 2, Column: 0, IndexInColumn: 0, stretch:true Columns are then assigned to each component (STEP 560). Components that are assigned same section may be assigned columns based on the HTML left value of the component. As an example, if there are components that are to the right of the first component in the section then those are assigned same section but incrementing column numbers. For the simple.html example there are none.

Components can also be stacked in a column and are identified based on the previous all siblings (STEP 570). For simple.html the output of this step is as below Component: 0, Section: 0, Column: 0, IndexInColumn: 0, stretch:false
Component: 1, Section: 0, Column: 0, IndexInColumn: 1, stretch:false
Component: 2, Section: 0, Column: 0, IndexInColumn: 2, stretch:false If needed, the identified component HTML is corrected (STEP 580). These corrections may be needed, for example, if some CSS cannot be found from the identified component HTML. In this case the parent hierarchy may also be included into the component HTML in the component 168 or the component when it is included in the template 172.

The components can then be inserted into the template 172 in their determined location in the grid layout of the template 172. (STEP 582). In particular, the editor 102 at the browser 124 sends data corresponding to components (e.g., components 169 maintained by the editor 102) to the web content development platform 100. Based on this data, corresponding component definitions 164 may be selected, the XML of those component definitions 164 included in the template 172 in the determined location and the XML of that component populated with data associated with the HTML or other data of the component.

Along with the components, all the CSS links on the HTML page (e.g., currently being rendered in the presented page by the editor 102) are added as resources to the template 172 being created and all script tags with src attributes are added as JavaScript to the template 172 (STEP 590). These additions may be desired so that when the template 172 is previewed or edited the required CSS styles and JavaScript(s) are available to be rendered. Examples of component instances that would be included in a template for the example simple.html are included in Appendix B.

Figure 11:
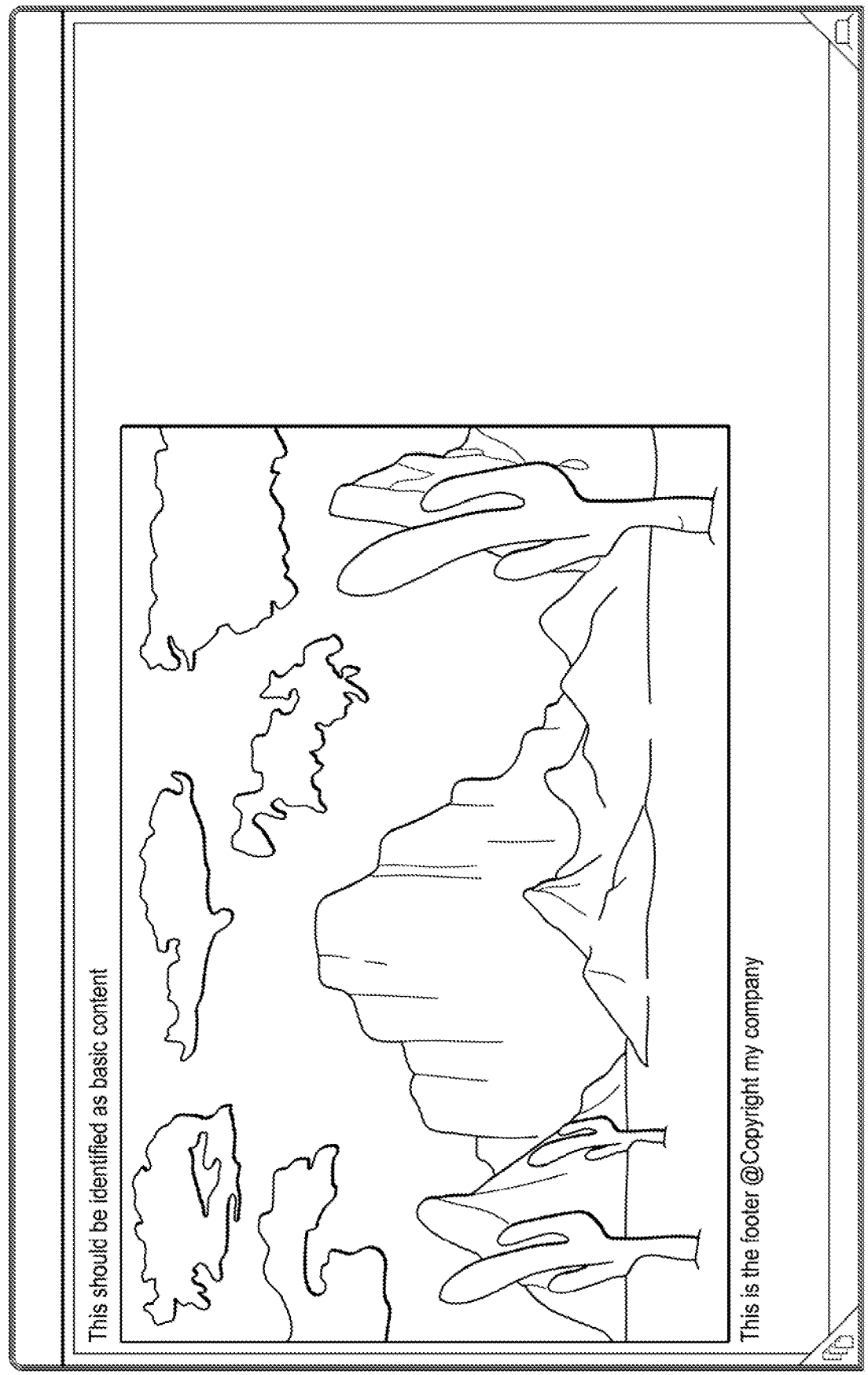
FIG. 11 is one embodiment of a screenshot of a preview of a template.

The saved template 172 can then be previewed by the editor 102. FIG. 11 depicts one embodiment of a preview of the saved template created by the user based on the simple.html example used herein.

Those skilled in the relevant art will appreciate that embodiments can be implemented or practiced with other computer system configurations, including without limitation multi-processor systems, network devices, mini-computers, mainframe computers, data processors, and the like. The invention can be embodied in special purpose computers or data processor that are specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing device (e.g., other native components, etc.).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the meaning of "in" includes "in" and "on" unless the context clearly dictates otherwise.

APPENDIX A

Basic Content Component:

```
<?xml version="1.0" encoding="UTF-8"?>
<Component ID="1196707488976" Version="3.1.1.0" PageID="0"
TemplateComponentID="0" CanBeActive="true"
Checksum="7146ad0a84bcbef96985faaece169979654295e9">
    <Description>Displays rich text and images.</Description>
    <SelectedSkin>Default HTML</SelectedSkin>
    <DisplayName></DisplayName>
    <Name></Name>
    <IsMobileComponent>false</IsMobileComponent>
    <BaseComponent
Version="0"><![CDATA[//authoring.iminfra.local/iwadmin/main/livesite/component/
WORKAREA/Installed Components/Interwoven/Marketing/Content/Basic
Content.component]]></BaseComponent>
    <ContainerProperties ID="0" locked="false">
       <KixedLayoutArea ID=" " index="0"/>
       <CacheTime>-1</CacheTime>
       <BGColor></BGColor>
       <Width>600</Width>
       <WidthPercent>0.0</WidthPercent>
       <Height>300</Height>
       <WidthType>absolute</WidthType>
       <HeightType>absolute</HeightType>
       <Top>75</Top>
       <Left>100</Left>
       <ZIndex>0</ZIndex>
       <RenderInRuntime>true</RenderInRuntime>
```

-continued

```
      <JavascriptCallback/>
   </ContainerProperties>
   <InternalProperties/>
   <Locks>
      <ContainerProperties locked="false" Changed="false"/>
      <Properties locked="false" Changed="false"/>
      <Data locked="false" Changed="false"/>
   </Locks>
   <Segments>
      <Segment ID="0">
         <Properties ComponentID="1196707488976">
            <Datum ID="CSSCLASS" Name="Associated CSS Class" Type="String"/>
            <Datum ID="CSS" Name="Inline CSS" Type="String"/>
            <Datum ID="CSSID" Name="CSS ID" Type="String" Optimizable="false"/>
         </Properties>
         <Data>
            <Datum ID="CONTENT" Name="Content" Type="Textarea"><p>Content
To Test For OverWrite</p></Datum>
         </Data>
      </Segment>
   </Segments>
   <Stylesheet Default="true" PageType="htmlQuirksMode" RequiredPageLayout=" "
ContentType=" " RenderingEngine="html">
      <Name>Default HTML</Name>
      <xSL><div
class="$MODEL{/Properties/Datum[@ID='CSSCLASS']}"
style="$MODEL{/Properties/Datum[@ID='CSS']}"
id="$MODEL{/Properties/Datum[@ID='CSSID']}"
><span in-context-
edit="$MODEL{/Properties/Data/Datum[@ID='CONTENT']/@ID}">$MODEL{/Properties/
Data/Datum[@ID='CONTENT']}</span></div>
      </XSL>
   </Stylesheet>
   <Stylesheet Default="false" PageType=" " RequiredPageLayout=" "
ContentType="text/html" RenderingEngine="xsl">
      <Name>XSL Rendered</Name>
      <XSL>     <!DOCTYPE html-entities SYSTEM
"http://www.interwoven.com/livesite/xsl/xsl-html.dtd">
         <xsl:stylesheet version="1.0"
xmlns:xsl="http://www.w3.org/1999/XSL/Transform">
         <!-- Skin: Default (Default Browser Type) -->
         <xsl:template match="/">
         <div>
         <xsl:attribute name="class">
         <xsl:value-of select="/Properties/Datum[@ID='CSSCLASS']"/>
         </xsl:attribute>
         <xsl:attribute name="style">
         <xsl:value-of select="/Properties/Datum[@ID='CSS'] "/>
         </xsl:attribute>
         <xsl:attribute name="id">
         <xsl:value-of select="/Properties/Datum[@ID='CSSID']"/>
         </xsl:attribute>
         <span in-context-
edit="{/Properties/Data/Datum[@ID='CONTENT']/@ID}">
         <xsl:value-of select="/Properties/Data/Datum[@ID='CONTENT']"
disable-output-escaping="yes"/>
         </span>
         </div>
         </xsl:template>
         </xsl:stylesheet>
      </XSL>
   </Stylesheet>
</Component>
```

Basic Image Component

```
<Component ID="1194989272288" Version="3.1.1.0" PageID="0"
TemplateComponentID="0" CanBeActive="true"
Checksum="8bdfc6da13233b8c12c15a4e3e362d4117d16129">
      <Description>Displays the specified image.</Description>
      <SelectedSkin>Default HTML</SelectedSkin>
      <DisplayName/>
      <Name/>
      <IsMobileComponent>false</IsMobileComponent>
      <BaseComponent Version="0">
         <![CDATA[//sitepubdev/iwadmin/main/livesite/component/WORKAREA/Installed
```

```
Components/Interwoven/Digital Asset/Image/Basic Image.component]]>
        </BaseComponent>
        <ContainerProperties ID="0" locked="false">
            <FixedLayoutArea ID=" " index="0"/>
            <CacheTime>-1</CacheTime>
            <BGColor/>
            <Width>250</Width>
            <Height>100</Height>
            <Top>10</Top>
            <Left>10</Left>
            <ZIndex>0</ZIndex>
            <RenderInRuntime>true</RenderInRuntime>
            <JavascriptCallback/>
            <WidthType/>
            <HeightType/>
            <WidthPercent/>
        </ContainerProperties>
        <InternalProperties/>
        <Locks>
            <ContainerProperties locked="false" Changed="false"/>
            <Properties locked="false" Changed="false"/>
            <Data locked="false" Changed="false"/>
        </Locks>
        <Segments>
            <Segment ID="0">
                <Properties ComponentID="1194989272288">
                    <Datum ID="IMGCLASS" Name="Associated CSS Class" Type="String"/>
                </Properties>
                <Data>
                    <Datum ID="IMGSRC" Name="Image" Type="Image">
                        <Image>
                            <Path/>
                            <Description>Select an image and edit this description</Description>
                        </Image>
                    </Datum>
                </Data>
            </Segment>
        </Segments>
        <Stylesheet Default="true" PageType="htmlQuirksMode" RequiredPageLayout=" " ContentType=" " RenderingEngine="html">
            <Name>Default HTML</Name>
            <XSL><div ddGroup="imageDropZoneGroup" ddGroupPropertyId="$MODEL{/Properties/Data/Datum[@ID='IMGSRC']/@ID)" in-context-edit="$MODEL{/Properties/Data/Datum[@ID='IMGSRC']/@ID)">
            <img src="$MODEL{/Properties/Data/Datum[@ID='IMGSRC']/Image/Path}" alt="$EX MODEL{HTML_ESCAPE;/Properties/Data/Datum[@ID='IMGSRC']/Image/Description)" title="$EX MODEL{HTML_ESCAPE;/Properties/Data/Datum[@ID='IMGSRC']/Image/Description)" class="$MODEL{/Properties/Datum[@ID='IMGCLASS'] }"/>
            </div></XSL>
        </Stylesheet>
        <Stylesheet Default="false" PageType=" " RequiredPageLayout=" " ContentType="text/html" RenderingEngine="xsl">
            <Name>XSL Rendered</Name>
            <xSL><!DOCTYPE html-entities SYSTEM "http://www.interwoven.com/livesite/xsl/xsl-html.dtd">
<xsl:stylesheet version="1.0" xmlns:xsl="http://www.w3.org/1999/XSL/Transform">
    <!-- Skin: Default (Default Browser Type) -->
    <xsl:include href="http://www.interwoven.com/livesite/xsl/HTMLTemplates.xsl"/>
    <xsl:include href="http://www.interwoven.com/livesite/xsl/StringTemplates.xsl"/>
    <xsl:template match="/">
        <div in-context-edit="{/Properties/Data/Datum[nD='IMGSRC']/@ID}">
            <img>
                <xsl:attribute name="src"><xsl:value-of select="Properties/Data/Datum[@ID='IMGSRC']/Image/Path"/></xsl:attribute>
                <xsl:attribute name="alt"><xsl:value-of select="Properties/Data/Datum[@ID='IMGSRC']/Image/Description"/></xsl:attribute>
                <xsl:attribute name="title"><xsl:value-of select="Properties/Data/Datum[@ID='IMGSRC']/Image/Description"/></xsl:attribute>
                <xsl:attribute name="class"><xsl:value-of select="Properties/Datum[@ID='IMGCLASS']"/></xsl:attribute>
            </img>
        </div>
    </xsl:template>
```

```
</xsl:stylesheet></XSL>
    </Stylesheet>
</Component>
```

Basic Embed HTML Component

```
<Component ID="1194287481747" Version="3.1.1.0" PageID="0"
TemplateComponentID="0" CanBeActive="true"
Checksum="e102a687f859f0b47ca7da1b4de79a04218e3b29">
    <Description>Displays HTML markup as entered.</Description>
    <SelectedSkin>Default HTML</SelectedSkin>
    <DisplayName/>
    <Name/>
    <IsMobileComponent>false</IsMobileComponent>
    <BaseComponent Version="0">
    <![CDATA[//sitepubdev/iwadmin/main/livesite/component/WORKAREA/Installed
Components/Interwoven/Marketing/Advanced/Basic Embed HTML.component]]>
    </BaseComponent>
    <ContainerProperties ID="0" locked="false">
        <FixedLayoutArea ID=" " index="0"/>
        <CacheTime>-1</CacheTime>
        <BGColor/>
        <Width>800</Width>
        <Height>400</Height>
        <Top>10</Top>
        <Left>10</Left>
        <ZIndex>0</ZIndex>
        <FenderInRuntime>true</FenderInRuntime>
        <JavascriptCallback/>
        <WidthType/>
        <HeightType/>
        <WidthPercent/>
    </ContainerProperties>
    <InternalProperties/>
    <Locks>
        <ContainerProperties locked="false" Changed="false"/>
        <Properties locked="false" Changed="false"/>
        <Data locked="false" Changed="false"/>
    </Locks>
    <Segments>
        <Segment ID="0">
            <Properties ComponentID="1194287481747"/>
            <Data>
                <Datum ID="HTML" Name="HTML Text"
Type="Textarea"><p>&lt;!-- Paste in UNFORMATTED raw HTML here, as
you would find in the source for a .htm or .html file.&nbsp; It will be
parsed and displayed as HTML.&nbsp; Using any of the rich text edit
controls above can result in unexpected behavior. --
&gt;</p><p>An Example List:<br
/>&lt;ul&gt;<br />&nbsp;
&lt;li&gt;&lt;b&gt;bold thing
1&lt;/b&gt;&lt;/li&gt;<br />&nbsp; &lt;li
style=&#39;color:#339933;&#39;&gt;green thing
2&lt;/li&gt;<br />&lt;/ul&gt;<br />&lt;p
sticky&gt;Since paragraph tags are stripped to remove RTE formatting, use
the &#39;sticky&#39; attribute in your p tags to ensure they are
correctly kept, like this: &amp;lt;p
sticky&amp;gt;&lt;i&gt;your
paragraph&lt;/i&gt;&amp;lt;/p sticky&gt;.&lt;/p
sticky&gt;</p><p>&lt;p sticky&gt;Break tags are also
removed, but only if written b-r-space-slash like this &amp;lt;br
Aamp;amp;gt;.&nbsp; Just omit the space to ensure your breaks are kept
like &amp;lt;br/&amp;gt; this.&nbsp; You can also use the
&#39;sticky&#39; attribute on your br like this &amp;lt;br sticky
Aamp;amp;gt; if desired.&lt;/p
sticky&gt;</p><p>&lt;p sticky&gt;<br />Lastly,
anything resembling a URL will be transformed by the RTE into a link, even
though when pasting in HTML it is likely a quoted href for an anchor tag, not
a plain string you want to be auto-linked.&nbsp; If your HTML contains
URLs within anchor tag hrefs, simply click them and choose the unlink control
button in the RTE to undo the auto-link.<br />&lt;/p
sticky&gt;</p></Datum>
            </Data>
        </Segment>
    </Segments>
    <Stylesheet Default="true" PageType="htmlQuirksMode"
```

```
RequiredPageLayout=" " ContentType=" " RenderingEngine="html">
        <Name>Default HTML</Name>
        <XSL><div id="shownText">
        $MODEL{/Properties/Data/Datum[@ID=THTML']}
</div></XSL>
      </Stylesheet>
      <Stylesheet Default="false" PageType="htmlQuirksMode"
RequiredPageLayout=" " ContentType="text/html" RenderingEngine="xsl">
        <Name>XSL Rendered</Name>
        <xSL><!DOCTYPE html-entities SYSTEM
"http://www.interwoven.com/livesite/xsl/xsl-html.dtd">
<xsl:stylesheet version="1.0"
xmlns:xsl="http://www.w3.org/1999/XSL/Transform">
  <!-- Skin: Default (Default Browser Type) -->
  <xsl:include
href="http://www.interwoven.com/livesite/xsl/HTMLTemplates.xsl"/>
  <xsl:include
href="http://www.interwoven.com/livesite/xsl/StringTemplates.xsl"/>
  <xsl:template match="/">
    <div id="shownText">
        $MODEL{/Properties/Data/Datum[@ID='HTML']}
</div>
  </xsl:template>
</xsl:stylesheet></XSL>
      </Stylesheet>
</Component>
```

APPENDIX B

Component snippets included in the template file. Note the datum is highlighted through the use of italics. For simplicity, the text/html skin of the component is not included in the depicted snippet.

Instance of the Basic Content component:

```
<Component ID="1479751821312" Version="3.1.1.0" PageID="0"
TemplateComponentID="0" CanBeActive="true"
Checksum="b40d75e46a4ad412e3892e3defb0752c1b992799">
    <Description>Displays rich text and images.</Description>
    <SelectedSkin>Default HTML</SelectedSkin>
    <DisplayName>Basic Content</DisplayName>
    <Name>Basic Content</Name>
    <IsMobileComponent>false</IsMobileComponent>
    <BaseComponent Version="3"><![CDATA[Interwoven/Marketing/Content/Basic Content.component]]></BaseComponent>
    <ContainerProperties ID="0" locked="false">
      <FixedLayoutArea ID=" " index="0"/>
      <CacheTime>-1</CacheTime>
      <BGColor/>
      <Width>600</Width>
      <WidthPercent>0.0</WidthPercent>
      <Height>300</Height>
      <WidthType>absolute</WidthType>
      <HeightType>absolute</HeightType>
      <Top>75</Top>
      <Left>100</Left>
      <ZIndex>0</ZIndex>
      <RenderInRuntime>true</RenderInRuntime>
      <JavascriptCallback/>
    </ContainerProperties>
    <InternalProperties/>
    <Locks>
      <ContainerProperties locked="false" Changed="false"/>
      <Properties locked="false" Changed="false"/>
      <Data locked="false" Changed="false"/>
    </Locks>
    <Segments>
      <Segment ID="0">
        <Properties ComponentID="1479751821312">
          <Datum ID="CSSCLASS" Name="Associated CSS Class" Type="String"/>
          <Datum ID="CSS" Name="Inline CSS" Type="String"/>
          <Datum ID="CSSID" Name="CSS ID" Type="String" Optimizable="false"/>
        </Properties>
        <Data>
          <Datum ID="CONTENT" Name="Content" Type="Textarea" Changed="true"><div>
            This should be identified as basic content
          </div></Datum>
```

```
        </Data>
      </Segment>
    </Segments>
    <Stylesheet Default="true" PageType="htmlQuirksMode"
RequiredPageLayout=" " ContentType=" " RenderingEngine="html">
      <Name>Default HTML</Name>
      <xSL><div
class="$MODEL{/Properties/Datum[@ID='CSSCLASS']}"
style="$MODEL{/Properties/Datum[@ID='CSS']}"
id="$MODEL{/Properties/Datum[@ID='CSSID']}"
><span in-context-
edit="$MODEL{/Properties/Data/Datum[@ID='CONTENT']/@ID}">$MODEL{/Proper-
ties/
Data/Datum[@ID='CONTENT']}</span></div>
      </XSL>
    </Stylesheet>
  </Component>
```

Instance of the Basic Image component

```
<Component ID="1479751821316" Version="3.1.1.0" PageID="0"
TemplateComponentID="0" CanBeActive="true"
Checksum="6586ac403e4a247b58c83bc07a8dc46cada98e3a">
    <Description>Displays the specified image.</Description>
    <SelectedSkin>Default HTML</SelectedSkin>
    <DisplayName>Basic Image</DisplayName>
    <Name>Basic Image</Name>
    <IsMobileComponent>false</IsMobileComponent>
    <BaseComponent Version="1"><![CDATA[Interwoven/Digital
Asset/Image/Basic Image.component]]></BaseComponent>
    <ContainerProperties ID="0" locked="false">
      <FixedLayoutArea ID=" " index="0"/>
      <CacheTime>-1</CacheTime>
      <BGColor/>
      <Width>250</Width>
      <Height>100</Height>
      <Top>10</Top>
      <Left>10</Left>
      <ZIndex>0</ZIndex>
      <RenderInRuntime>true</RenderInRuntime>
      <JavascriptCallback/>
      <WidthType/>
      <HeightType/>
      <WidthPercent/>
    </ContainerProperties>
    <InternalProperties/>
    <Locks>
      <ContainerProperties locked="false" Changed="false"/>
      <Properties locked="false" Changed="false"/>
      <Data locked="false" Changed="false"/>
    </Locks>
    <Segments>
      <Segment ID="0">
        <Properties ComponentID="1479751821316">
          <Datum ID="IMGCLASS" Name="Associated CSS Class"
Type="String"/>
        </Properties>
        <Data>
          <Datum ID="IMGSRC" Name="Image" Type="Image" Changed="true">
            <Image>
<Path>$URL_PREFIX/importHTML/site1/simple_dependencies/Desert.jpg</Path>
              <Description/>
            </Image>
          </Datum>
        </Data>
      </Segment>
    </Segments>
    <Stylesheet Default="true" PageType="htmlQuirksMode"
      RequiredPageLayout=" " ContentType=" " RenderingEngine="html">
      <Name>Default HTML</Name>
      <XSL><div ddGroup="imageDropZoneGroup"
ddGroupPropertyId="$MODEL{/Properties/Data/Datum[@ID='IMGSRC']/@ID}" in-
context-edit="$MODEL{/Properties/Data/Datum[@ID='IMGSRC']/@ID}">
   <img src="SMODEL{/Properties/Data/Datum[@ID='IMGSRC']/Image/Path}"
alt="$EX_MODEL{HTML_ESCAPE;/Properties/Data/Datum[@ID='IMGSRC']/Image/
Description}"
title="$EX_MODEL{HTML_ESCAPE;/Properties/Data/Datum[@ID='IMGSRC']/Image/
```

```
Description}" class="SMODEL{/Properties/Datum[@ID='IMGCLASS']}"/>
</div></XSL>
        </Stylesheet>
    </Component>
<Component ID="1479751821320" Version="3.1.1.0" PageID="0"
TemplateComponentID="0" CanBeActive="true"
Checksum="b4306cbcdfb821ff18368705e7b8c0f6880200f0">
        <Description>Displays HTML markup as entered.</Description>
        <SelectedSkin>Default HTML</SelectedSkin>
        <DisplayName>Basic Embed HTML</DisplayName>
        <Name>Basic Embed HTML</Name>
        <IsMobileComponent>false</IsMobileComponent>
        <BaseComponent Version="1"><![CDATA[Interwoven/Marketing/Advanced/Basic
Embed HTML.component]]></BaseComponent>
        <ContainerProperties ID="0" locked="false">
            <EixedLayoutArea ID=" " index="0"/>
            <CacheTime>-1</CacheTime>
            <BGColor/>
            <Width>800</Width>
            <Height>400</Height>
            <Top>10</Top>
            <Left>10</Left>
            <ZIndex>0</ZIndex>
            <RenderInRuntime>true</RenderInRuntime>
            <JavascriptCallback/>
            <WidthType/>
            <HeightType/>
            <WidthPercent/>
        </ContainerProperties>
        <InternalProperties/>
        <Locks>
            <ContainerProperties locked="false" Changed="false"/>
            <Properties locked="false" Changed="false"/>
            <Data locked="false" Changed="false"/>
        </Locks>
        <Segments>
            <Segment ID="0">
                <Properties ComponentID="1479751821320"/>
                <Data>
                    <Datum ID="HTML" Name="HTML Text" Type="Textarea"
Changed="true"><footer>
<div>
  This is the footer @Copyright my company
</div>
</footer></Datum>
                </Data>
            </Segment>
        </Segments>
        <Stylesheet Default="true" PageType="htmlQuirksMode"
RequiredPageLayout=" " ContentType=" " RenderingEngine="html">
            <Name>Default HTML</Name>
            <XSL><div id="shownText">
                $MODEL{/Properties/Data/Datum[@ID='HTML']}
</div></XSL>
        </Stylesheet>
        <Stylesheet Default="false" PageType="htmlQuirksMode"
RequiredPageLayout=" " ContentType="text/html" RenderingEngine="xsl">
            <Name>XSL Rendered</Name>
            <XSL><!DOCTYPE html-entities SYSTEM
"http://www.interwoven.com/livesite/xsl/xsl-html.dtd">
<xsl:stylesheet version="1.0"
xmlns:xsl="http://www.w3.org/1999/XSL/Transform">
   <!-- Skin: Default (Default Browser Type) -->
   <xsl:include
href="http://www.interwoven.com/livesite/xsl/HTMLTemplates.xsl"/>
   <xsl:include
href="http://www.interwoven.com/livesite/xsl/StringTemplates.xsl"/>
   <xsl:template match="/">
     <div id="shownText">
          $MODEL{/Properties/Data/Datum[@ID='HTML']}
</div>
   </xsl:template>
</xsl:stylesheet></XSL>
        </Stylesheet>
    </Component>
```

Instance of the Basic Embed HTML component—

What is claimed is:

1. A system for web development, comprising:
a web developer, including a processor and storage, the web developer coupled over a network to a client device, and
the web developer including computer executable instructions to:
receive a web page from the client at an editor executing on a browser at the client device;
render, by the editor executing on the browser at the client device, the web page in the browser executing the editor to present the rendered web page in the browser, wherein rendering the web page in the browser executing the editor to present the rendered web page in the browser is accomplished by the editor inserting the received web page into instructions of the editor such that the received web page is rendered in the browser in association with execution of the editor by the browser and the received web page is inserted into the set of instructions of the editor;
identify, by the editor, portions of the web page, wherein identifying the portions of the web page comprises processing the set of instructions of the editor to identify the portions of the web page within the instructions of the editor;
evaluate, by the editor, the identified portions of the web page to determine separate parts of the web page, wherein each identified part is evaluated based on a tag associated with the identified part to determine if the identified part is a separate part based on an evaluation whether the tag associated with the identified part of the instructions of the editor is an identifier associated with the editor;
generate, by the editor, a component for each of the identified separate parts, wherein the generation of the component for the separate parts comprises identifying a component type for the separate part based on content of the separate part of the web page, generating the component of the identified component type based on a component definition for the component type, and populating a datum of the generated component based on the portion of the web page associated with the corresponding separate part, and wherein the component definition for the component type is coding language defining each component of the component type, generating the component comprises saving a copy of the component definition for the component type as the generated component and populating the datum of the generated component comprises inserting content from the corresponding separate part into the generated component at a location for the datum defined by the coding language of the component definition;
identify, by the editor executing on the browser, the generated components in the rendered web page presented by the browser;
receive, by the editor, an instruction to accept the identified components; and
generate, by the editor, a template at the web developer including the identified components.

2. The system of claim 1, wherein the instructions of the editor include instructions associated with an identifying pattern and the web page comprises Hypertext Markup Language (HTML), and identifying elements of the HTML comprises, obtaining a Document Object Model (DOM) associated with the rendered HTML from the browser executing the editor, and identifying all elements in the DOM that are not script, link or style tags and do not have the identifying pattern associated with the instructions of the editor.

3. The system of claim 2, wherein the identifying pattern is an HTML tag associated with the editor.

4. The system of claim 1, wherein generating the template comprises inserting the identified components in the template according to a grid layout by assigning each of the identified components to a section of the grid layout according to a location of the identified component in a layout of the identified components presented in the browser.

5. The system of claim 1, wherein the components created for the separate parts are maintained by the editor at the browser on the client device.

6. The system of claim 1, wherein the component type is a basic image component type, a basic content component type or a basic embedded HTML component type.

7. The system of claim 1, wherein a corresponding mask is generated for each generated component and identifying the generated components comprises rendering, by the editor, the corresponding mask in the browser executing the editor.

8. A method, comprising:
receiving a web page from the client at an editor executing on a browser at the client device;
rendering, by the editor executing on the browser at the client device, the web page in the browser executing the editor to present the rendered web page in the browser, wherein rendering the web page in the browser executing the editor to present the rendered web page in the browser is accomplished by the editor inserting the received web page into instructions of the editor such that the received web page is rendered in the browser in association with execution of the editor by the browser and the received web page is inserted into the set of instructions of the editor;
identifying, by the editor, portions of the web page, wherein identifying the portions of the web page comprises processing the set of instructions of the editor to identify the portions of the web page within the instructions of the editor;
evaluating, by the editor, the identified portions of the web page to determine separate parts of the web page, wherein each identified part is evaluated based on a tag associated with the identified part to determine if the identified part is a separate part based on an evaluation whether the tag associated with the identified part of the instructions of the editor is an identifier associated with the editor;
generating, by the editor, a component for each of the identified separate parts, wherein the generation of the component for the separate parts comprises identifying a component type for the separate part based on content of the separate part of the web page, generating the component of the identified component type based on a component definition for the component type, and populating a datum of the generated component based on the portion of the web page associated with the corresponding separate part, and wherein the component definition for the component type is coding language defining each component of the component type, generating the component comprises saving a copy of the component definition for the component type as the generated component and populating the datum of the generated component comprises inserting content from the corresponding separate part into the generated component at a location for the datum defined by the coding language of the component definition;

identifying, by the editor executing on the browser, the generated components in the rendered web page presented by the browser;

receiving, by the editor, an instruction to accept the identified components; and generating, by the editor, a template at the web developer including the identified components.

9. The method of claim 1, wherein the instructions of the editor include instructions associated with an identifying pattern and the web page comprises Hypertext Markup Language (HTML), and identifying elements of the HTML comprises, obtaining a Document Object Model (DOM) associated with the rendered HTML from the browser executing the editor, and identifying all elements in the DOM that are not script, link or style tags and do not have the identifying pattern associated with the instructions of the editor.

10. The method of claim 9, wherein the identifying pattern is an HTML tag associated with the editor.

11. The method of claim 8, wherein generating the template comprises inserting the identified components in the template according to a grid layout by assigning each of the identified components to a section of the grid layout according to a location of the identified component in a layout of the identified components presented in the browser.

12. The method of claim 8, wherein the components created for the separate parts are maintained by the editor at the browser on the client device.

13. The method of claim 8, wherein the component type is a basic image component type, a basic content component type or a basic embedded HTML component type.

14. The method of claim 8, wherein a corresponding mask is generated for each generated component and identifying the generated components comprises rendering, by the editor, the corresponding mask in the browser executing the editor.

15. A non-transitory computer readable medium comprising instructions for:

receiving a web page from the client at an editor executing on a browser at the client device;

rendering, by the editor executing on the browser at the client device, the web gage in the browser executing the editor to present the rendered web page in the browser, wherein rendering the web page in the browser executing the editor to present the rendered web page in the browser is accomplished by the editor inserting the received web page into instructions of the editor such that the received web page is rendered in the browser in association with execution of the editor by the browser and the received web page is inserted into the set of instructions of the editor;

identifying, by the editor, portions of the web page, wherein identifying the portions of the web page comprises processing the set of instructions of the editor to identify the portions of the web page within the instructions of the editor;

evaluating, by the editor, the identified portions of the web page to determine separate parts of the web page, wherein each identified part is evaluated based on a tag associated with the identified part to determine if the identified part is a separate part based on an evaluation whether the tag associated with the identified part of the instructions of the editor is an identifier associated with the editor;

generating, by the editor, a component for each of the identified separate parts, wherein the generation of the component for the separate parts comprises identifying a component type for the separate part based on content of the separate part of the web page, generating the component of the identified component type based on a component definition for the component type, and populating a datum of the generated component based on the portion of the web page associated with the corresponding separate part, and wherein the component definition for the component type is coding language defining each component of the component type, generating the component comprises saving a copy of the component definition for the component type as the generated component and populating the datum of the generated component comprises inserting content from the corresponding separate part into the generated component at a location for the datum defined by the coding language of the component definition;

identifying, by the editor executing on the browser, the generated components in the rendered web page presented by the browser;

receiving, by the editor, an instruction to accept the identified components; and generating, by the editor, a template at the web developer including the identified components.

16. The non-transitory computer readable medium of claim 15, wherein the instructions of the editor include instructions associated with an identifying pattern and the web page comprises Hypertext Markup Language (HTML), and identifying elements of the HTML comprises, obtaining a Document Object Model (DOM) associated with the rendered HTML from the browser executing the editor, and identifying all elements in the DOM that are not script, link or style tags and do not have the identifying pattern associated with the instructions of the editor.

17. The non-transitory computer readable medium of claim 16, wherein the identifying pattern is an HTML tag associated with the editor.

18. The non-transitory computer readable medium of claim 15, wherein generating the template comprises inserting the identified components in the template according to a grid layout by assigning each of the identified components to a section of the grid layout according to a location of the identified component in a layout of the identified components presented in the browser.

19. The non-transitory computer readable medium of claim 15, wherein the components created for the separate parts are maintained by the editor at the browser on the client device.

20. The non-transitory computer readable medium of claim 15, wherein the component type is a basic image component type, a basic content component type or a basic embedded HTML component type.

21. The non-transitory computer readable medium of claim 15, wherein a corresponding mask is generated for each generated component and identifying the generated components comprises rendering, by the editor, the corresponding mask in the browser executing the editor.

* * * * *

UNITED STATES PATENT AND TRADEMARK OFFICE
CERTIFICATE OF CORRECTION

PATENT NO. : 11,580,297 B2
APPLICATION NO. : 17/544842
DATED : February 14, 2023
INVENTOR(S) : John W. Chang et al.

It is certified that error appears in the above-identified patent and that said Letters Patent is hereby corrected as shown below:

In the Claims

At Column 35, Line 45, replace "gage" with --page--.

Signed and Sealed this
Twenty-fifth Day of April, 2023

Katherine Kelly Vidal
*Director of the United States Patent and Trademark Office*